US011978366B2

(12) United States Patent
Bruno

(10) Patent No.: US 11,978,366 B2
(45) Date of Patent: May 7, 2024

(54) COLLAR TAG

(71) Applicant: The Duck Company, Arvada, CO (US)

(72) Inventor: James N. Bruno, Denver, CO (US)

(73) Assignee: The Duck Company, Arvada, CO (US)

( * ) Notice: Subject to any disclaimer, the term of this patent is extended or adjusted under 35 U.S.C. 154(b) by 142 days.

(21) Appl. No.: 17/491,766

(22) Filed: Oct. 1, 2021

(65) Prior Publication Data

US 2022/0108633 A1 Apr. 7, 2022

Related U.S. Application Data

(60) Provisional application No. 63/086,244, filed on Oct. 1, 2020.

(51) Int. Cl.

| | |
|---|---|
| ***G09F 3/02*** | (2006.01) |
| ***G09F 3/00*** | (2006.01) |
| ***G09F 3/10*** | (2006.01) |
| ***G09F 3/16*** | (2006.01) |

(52) U.S. Cl.

CPC ........ *G09F 3/02883* (2021.05); *G09F 3/0297* (2013.01); *G09F 3/10* (2013.01); *G09F 3/16* (2013.01); *G09F 2003/0208* (2013.01); *G09F 2003/0264* (2013.01); *G09F 2003/0282* (2013.01)

(58) Field of Classification Search

CPC ...... G09F 3/02883; G09F 3/0297; G09F 3/10; G09F 3/16; G09F 2003/0208; G09F 2003/0264; G09F 2003/0282; G09F 2007/1852; G09F 3/20; B65D 85/182

See application file for complete search history.

(56) References Cited

U.S. PATENT DOCUMENTS

| | | | | |
|---|---|---|---|---|
| 2,690,624 A * | 10/1954 | Phillips | G09F 3/20 | 40/652 |
| 3,225,478 A * | 12/1965 | Rohmer | E05B 19/24 | 40/330 |
| 3,295,235 A * | 1/1967 | Tauber | G09F 3/185 | 224/230 |
| 4,930,234 A * | 6/1990 | Schmidt | G09F 3/06 | 40/1.5 |
| 6,684,544 B1 * | 2/2004 | Buettell | G09F 7/04 | 40/661.01 |
| 7,854,021 B2 * | 12/2010 | Compton | A41D 27/08 | 2/243.1 |
| 9,339,070 B2 * | 5/2016 | Rendon | A41D 27/08 | |

(Continued)

*Primary Examiner* — Gary C Hoge

(74) *Attorney, Agent, or Firm* — Neugeboren O'Dowd PC

(57) ABSTRACT

A hangtag for a product and related methods are disclosed. The hangtag has a foldable main body comprising a proximal portion having a first end and a second end, a distal portion having a first end and a second end, the first ends of the proximal and the distal portion having a first width, a crease portion positioned between the distal portion and the proximal portion, the crease portion having the first width and a first length extending between the distal portion and the proximal portion. The foldable main body is configured to be folded at or near the crease portion, where the crease portion is shaped and sized to mount the main body over one or more edges of the product such that the proximal portion is adjacent a first side of the product and the distal portion is adjacent a second side of the product.

19 Claims, 11 Drawing Sheets

(56) References Cited

U.S. PATENT DOCUMENTS

| | | | | |
|---|---|---|---|---|
| 2005/0060923 | A1* | 3/2005 | Ardern | G09F 7/02 40/658 |
| 2007/0273520 | A1* | 11/2007 | Chamandy | G06K 19/07749 340/572.1 |
| 2008/0035685 | A1* | 2/2008 | Matkovich | A47G 25/1421 116/200 |
| 2009/0294494 | A1* | 12/2009 | Ho | G09F 3/20 40/322 |
| 2011/0023342 | A1* | 2/2011 | Davidson | G09F 3/10 493/405 |
| 2011/0047838 | A1* | 3/2011 | Peterson | G09F 3/207 40/1.5 |

* cited by examiner

COLLAR TAG

CROSS REFERENCE TO RELATED APPLICATIONS

This application claims priority to U.S. Provisional Application No. 63/086,244 filed Oct. 1, 2020, and entitled "Gravity Hangtag", the entire disclosure of which is hereby incorporated by reference for all purposes.

FIELD OF THE DISCLOSURE

The present disclosure relates generally to retail tags. In particular, but not by way of limitation, the present disclosure relates to a foldable gravity retail tag for hanging on apparel, products containing such hangtags, and methods of applying and manufacturing such hangtags.

BACKGROUND OF THE DISCLOSURE

Hangtags, also known as swing tags, are ubiquitous in retail sales and the sales of other products, where such tags are used to promote products such as apparel, accessories, tools, etc. Hangtags may provide a surface for affixing a manufacturer's identifying label along with additional information about the product, such as a price.

Hangtags are usually attached to apparel products via a thin plastic wire (or joiner), also referred to as a plastic barb, where the plastic wire is attached to the apparel item though the threads of the clothing. In some cases, the plastic wire is in a T-shape and comprises two ends that are separated by an edge of the clothing. One of the biggest concerns of deploying such hangtags is the long-lasting damage these plastic wires cause to not only clothing, but also the environment. The plastic wires used for attaching hangtags to clothing are not recyclable and generally end up as landfill or seep into water ways. Furthermore, clothing is more susceptible to loose threads or tears since the plastic wires pass between the threading in the clothing. This is a cause for nuisance to customers.

While some clothing manufacturers have switched to threads instead of plastic wires for attaching hangtags to clothing, apparel items, such as t-shirts, do not have a convenient place for attachment of threaded hangtags (i.e., unless some additional modifications are made). In such cases, even these clothing manufacturers need to resort to using plastic wires for certain products.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

For the purposes of this disclosure, and when referencing a surface or portion of the gravity hangtag, the terms "top", "upper", "rear", and "proximal" shall refer to either (i) a side of, or a side of a product (e.g., a "rear" side of a t-shirt, or another clothing item) facing away from a customer or (ii) a side of a product facing away from, or a direction away from, the ground/floor (e.g., a position of one or more hangtag portions, surfaces, etc. before folding and placing or coupling the hangtag onto the product), while the terms "lower", "front", "distal", and "bottom" shall be associated with either (i) a product side (e.g., a "front" of a t-shirt) facing, or a direction towards, a customer or (ii) a product side facing, or a direction towards, the ground/floor (i.e., a portions of one or more hangtag portions, surfaces, etc., before folding and placing or coupling the hangtag onto the product). For instance, a first gravity hangtag (e.g., described in relation to FIG. 4) may be folded and mounted on a front edge of a product, such as a t-shirt, with the distal portion of the first gravity hangtag being visible to a user/consumer facing the front of the t-shirt. Further, the proximal portion of the hangtag may be adjacent an interior or rear face/side of the t-shirt front and may not be visible to the consumer facing the t-shirt front. Similarly, if a second gravity hangtag were folded and mounted on the rear edge of the t-shirt, the distal portion of the second gravity hangtag would be visible to a consumer looking at the rear of the t-shirt, while the proximal portion would be adjacent an interior face/side of the t-shirt facing away from such a customer. "Mounted" and "mount", as used herein means "to put in position" while the term "around" means "near", "close to", "about", and may comprise an amount within 10% of any identified measurement or other amount. As used herein, the term "substantially" may refer to a degree of similarity comprising within 1% or less of the compared measurement or other compared item. Similarly, the term "generally" refers to a 10% or less of the compared measurement or other compared item. The term coupled, as used herein, refers to the connecting, linking, joining, uniting, or associating of two separate items while the term "integrating" refers to a single unitary item.

Some embodiments of the disclosure may be characterized as a hangtag configured for at least one of placement on and coupling to one of a product and a product display, the hangtag comprising (i) a foldable main body, the foldable main body comprising a proximal portion having a first end and a second end, wherein the first end of the proximal portion has a first width; (ii) a distal portion having a first end and a second end, wherein the first end of the distal portion has the first width; and (iii) a crease portion positioned between the distal portion and the proximal portion, the crease portion having the first width and a first length extending between the distal portion and the proximal portion. In some embodiments, the foldable main body is configured to be folded at or near the crease portion, wherein the crease portion is shaped and sized to mount the main body over one or more edges of at least one of the product and the product display such that the proximal portion is adjacent a first side of the product or the product display and the distal portion is adjacent a second, opposing side of the product or the product display. In some embodiments, the one or more edges may couple or integrate the first side of the product or the product display to the second side of the product or the product display.

Some embodiments of the disclosure may be characterized as method for at least one of placement on and coupling a hangtag to a product, wherein the product includes a first side, a second side opposing the first side, and an edge integrated or coupled to the first side and the second side. In some embodiments, the hangtag comprises a foldable main body, the foldable main body comprising a proximal portion having a first end and a second end, wherein the first end of the proximal portion has a first width; a distal portion having a first end and a second end, wherein the first end of the distal portion has the first width; and a crease portion positioned between the distal portion and the proximal portion, the crease portion having the first width and a first length extending between the distal portion and the proximal portion. In some embodiments, the method further comprises folding the foldable main body at or near the crease portion, mounting the main body on the edge of the product such that at least a portion of the crease portion rests on or is in contact with the edge, and coupling the foldable main body relative to the product via one or more of frictional engagement of at least the portion of the crease portion with the edge, frictional engagement of the proximal portion with the first side of the product, and frictional engagement of the distal portion with the second side of the product.

Some other embodiments of the disclosure may be characterized as a product comprising: a first side; a second side; at least one edge connecting the first side and the second side; a hangtag placed over the at least one edge, the hangtag including: a foldable main body, the foldable main body comprising: a proximal portion having a first end and a second end, wherein the first end of the proximal portion has a first width, and wherein the proximal portion further comprises a proximal surface. The hangtag may further comprise a distal portion having a first end and a second end, wherein the first end of the proximal portion has the first width, and wherein the distal portion comprises a distal surface. The hangtag may yet further comprise a crease portion positioned between the distal portion and the proximal portion, the crease portion having the first width and a first length extending between the distal portion and the proximal portion, and wherein the crease portion comprises a crease surface. In some embodiments, the foldable main body may be configured to be folded at or near the crease portion from a first position to a second position, the first position comprising a generally linear position having a single planar surface comprising the proximal, distal, and crease portions, and the second position comprises the crease surface, the proximal surface, and the distal surface comprising separate planes. The crease portion may be shaped and sized to mount the foldable main body over the at least one edge of the product such that the proximal portion is adjacent the first side of the product and the distal portion is adjacent the second, opposing side of the product. The main body may be configured or comprised to remain stable or substantially stable under the force of gravity and at least in part on one or more of: an asymmetry in one or more of a weight, surface area, and an overall length between the proximal portion and the distal portion; friction between an inner face of the proximal portion and the first side of the product; and friction between an inner face of the distal portion and the second side of the product.

The proximal portion may comprise a first surface area and the distal portion may comprise a second, different surface area. The distal portion may comprise a rectangular section having the first width at the first end and a curved section at the second end, the curved section integrated with the rectangular section, and wherein a diameter of the curved section may be larger than the first width.

The proximal portion may comprise a rectangular section having a first length and the first width, wherein the first width may comprise a larger dimension than the first length, and wherein the first length of the proximal portion may comprise a length between 0.75 and 1.5 inches and the first width may comprise a width between 1.5 inches and 2.5 inches, which may preferably be around 1.75 inches.

In some embodiments, an overall length of the distal portion may comprise a length between 3 and 4 inches, wherein the overall length includes the diameter of the curved section and at least a portion of a length of the rectangular section of the distal portion, and wherein the diameter of the circular section is anywhere between 1.75 inches and 3 inches, and may preferably be around 2 inches.

In some embodiments, the crease portion comprises a crease surface; the proximal portion comprises a proximal surface; the distal portion comprises a distal surface; and the foldable main body is configured to pinch or clasp from a first position to a second position, where the first position comprises a generally linear position. Further, in some embodiments, in the second position, the crease surface comprises a first plane, the proximal surface comprises a second plane, and the distal surface comprises a third plane, wherein the first, second and third planes comprise different planes. In some embodiments, the second and third planes comprise one of generally and substantially parallel planes, and planes one of substantially and generally perpendicular to the first plane.

In some embodiments, the crease portion further comprises a first crease edge for receiving a first fold of the main body, the first crease edge located adjacent the proximal portion, and a second crease edge for receiving a second fold of the main body, the second crease edge located adjacent the distal portion. In some examples, each of the first crease edge and the second crease edge comprise the first width and the first length of the crease portion extends between the first crease edge and the second crease edge.

In some embodiments, the main body further comprises a main body edge; the main body edge comprises a thickness; the first length of the crease portion comprises a larger distance than the thickness of the main body edge; the first crease edge comprises a first pivot axis for the first fold; wherein at least part of the proximal portion is rotatably coupled to the crease portion via the first crease edge and configured to rotate about the first pivot axis; the second crease edge comprises a second pivot axis for the second fold; and at least part of the distal portion is rotatably coupled to the crease portion via the second crease edge and configured to rotate about the second pivot axis.

In some embodiments, when the main body is pinched or clasped from the first position to the second position and the hangtag is at least one of placed on and coupled to the product or the product display, the crease surface one of rests upon and couples to a generally horizontal surface of at least one edge of one of the product and the product display, the proximal surface and the distal surface extend below the crease surface, and the foldable main body remains generally stable on the product or the product display by one or more of: a respective weight of the proximal portion and the distal portion applying a force from the crease surface onto the generally horizontal surface; a respective weight of the proximal portion and the distal portion applying a force from the friction between the crease surface and the generally horizontal surface; an asymmetry in one or more of a weight, a surface area, and an overall length between the proximal portion and the distal portion; friction between an inner face of the proximal portion and the first side of the product; and friction between an inner face of the distal portion and the second side of the product.

In some embodiments, when the main body is pinched or clasped from the first position to the second position and the hangtag is at least one of placed on and coupled to the product or the product display, the crease surface one of rests upon and couples to a generally horizontal surface proximal (e.g., adjacent or near) to at least one edge of one of the product and the product display, the proximal surface and the distal surface extend below the crease surface, and the foldable main body remains generally stable on the product or the product display by one or more of: a weight of the proximal portion and the distal portion applying a force from the crease surface onto the generally horizontal surface; the weight of the proximal portion and the distal portion applying a frictional force between the crease surface and the generally horizontal surface; an asymmetry in one or more of a weight, a surface area, and an overall length between the proximal portion and the distal portion; friction between an inner face of the proximal portion and the first side of the product; and friction between an inner face of the distal portion and the second side of the product. Although not necessary, in some examples, the proximal portion and the distal portion may be asymmetric (e.g., proximal portion 110 has a smaller surface area, weight, and/or overall length than the distal portion 115 in FIG. 1).

In some embodiments, one or more of the proximal portion, the distal portion, and the crease portion include label bearing surfaces for displaying one or more of text and information pertaining to the product, the information comprising one or more of: a price, material of composition, cleaning instructions, a manufacturer or brand name, a manufacturer or brand logo, social media information, a Uniform Resource Locator (URL), a bar code, and a Quick Response (QR) code.

In some embodiments, the foldable main body is formed using one or more of cardboard, paper, silicone, rubber, wood, metal, plastic, bamboo, and fabric, and wherein at least one of the distal portion, the proximal portion, and the crease portion is composed of a different material, has a different rigidity or elasticity, or a combination thereof than another one of the distal portion, the proximal portion, and the crease portion.

In some embodiments, each of the second ends of the proximal portion and the distal portion are magnetic, and wherein, when the foldable main body is folded at or near the crease portion, the magnetic second ends of the proximal portion and the distal portion are configured to attract to each other such that the first side and the second side of the product are positioned between the proximal portion and the distal portion.

In some embodiments, each of the proximal portion and the distal portion comprise an outer face and an inner face, the inner face adjacent a respective one of the first side or the second side of the product, and wherein a respective inner face of at least one of the proximal portion and the distal portion comprises two or more layers including at least one adhesive layer.

BRIEF DESCRIPTION OF DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

The word “exemplary” is used herein to mean “serving as an example, instance, or illustration.” Any embodiment described herein as “exemplary” should not necessarily be construed as preferred or advantageous over other embodiments. In the following detailed description, references are made to the accompanying drawings that form a part hereof, and in which are shown illustrations or specific examples of one or more embodiments. Aspects of embodiments may be combined with aspects of other embodiments, other aspects may be utilized, and structural changes may be made without departing from the present disclosure. Example aspects may be practiced as methods, systems, or apparatuses. The following detailed description is therefore not to be taken in a limiting sense, and the scope of the present disclosure is defined by the appended claims and their equivalents.

As used herein, the terms “tag”, “hangtag”, “gravity hangtag”, “collar tag”, and “gravity tag” may be used interchangeably throughout the disclosure. Disclosed herein is a secure foldable gravity hangtag that provides one or more viewable surfaces for displaying information to the customer, is inexpensive, environmentally friendly (e.g., composed of recyclable materials, such as paper, metal, cardboard, etc.), and minimizes damage to products such as, but not limited to, apparel. Such information may comprise material of composition, social media information (e.g., a Quick Response (QR) code to a company’s social media account), company history and/or motto, inspiration behind the product, or any other promotional/advertising information. More specifically, but without limitation, the present disclosure relates to a foldable gravity tag and related methods. Although generally described as being attached to apparel items, such as t-shirts, the gravity hangtag described in this disclosure may be suitable for attaching to other products besides apparel, such as books, DVDs, Blu-Rays, or any other item having at least one generally or substantially horizontal, thin (i.e., longer than it is wide), and generally flat surface, also referred to herein as an "edge". In some embodiments, the gravity hangtag may be used for promoting and marketing a product or displaying additional information about the product to a customer.

Figure 1:
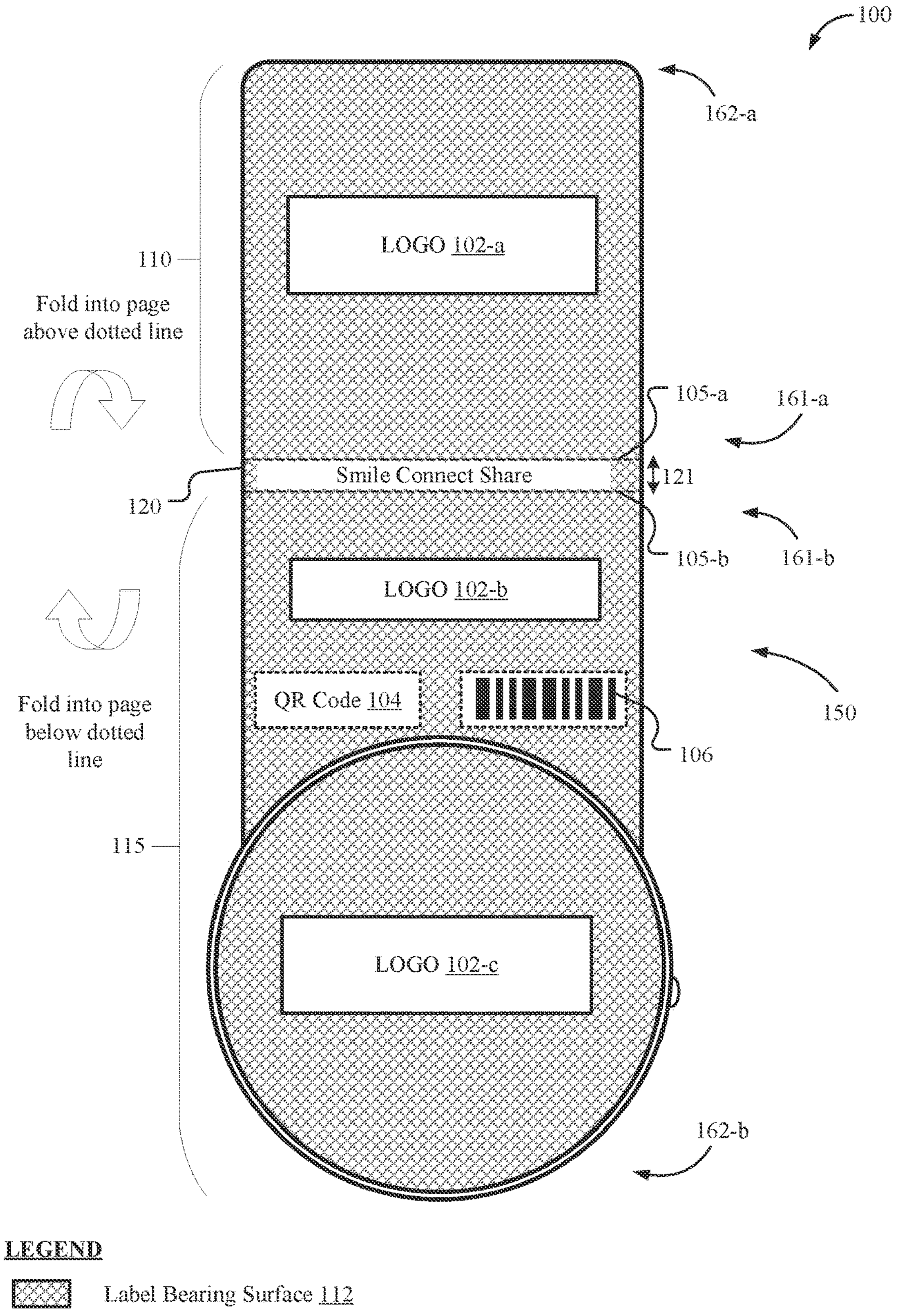
FIG. 1 illustrates a front view of a gravity hangtag in an unfolded position, according to one embodiment of the disclosure.

FIG. 1 illustrates a front view of a gravity hangtag 100 in accordance with at least one embodiment of this disclosure. FIG. 1 depicts gravity hangtag 100 in its unfolded layout. In some embodiments, the hangtag 100 comprises a foldable main body 150 having a proximal portion 110 (also referred to as top portion 110) having a first end 161-*a* and a second end 162-*a*, a distal portion 115 (also referred to as bottom portion 115) having a first end 161-*b* and a second end 162-*b*, and a crease portion 120. In some embodiments, the gravity hangtag 100 may be asymmetric. For instance, the proximal portion and the distal portion may have different dimensions (e.g., a different length), a different surface area, and/or a different weight. In some examples, the proximal portion 110 of the gravity hangtag 100 may be anywhere between 0.75 inches to 1.5 inches in length/height; for instance, around 1.25 inches. Further, the proximal portion 110 may be anywhere between 1.5 inches and 2.5 inches in width; for instance, around 1.75 inches. In the example shown, the distal portion 115 of the gravity hangtag 100 is longer than the proximal portion 110. However, in other cases, the proximal portion may be longer than the distal portion or the portions may be similarly sized. In some cases, the distal portion 115 may be anywhere between 3.0 and 4.0 inches in height, for instance, around 3.5 inches.

Figure 2:
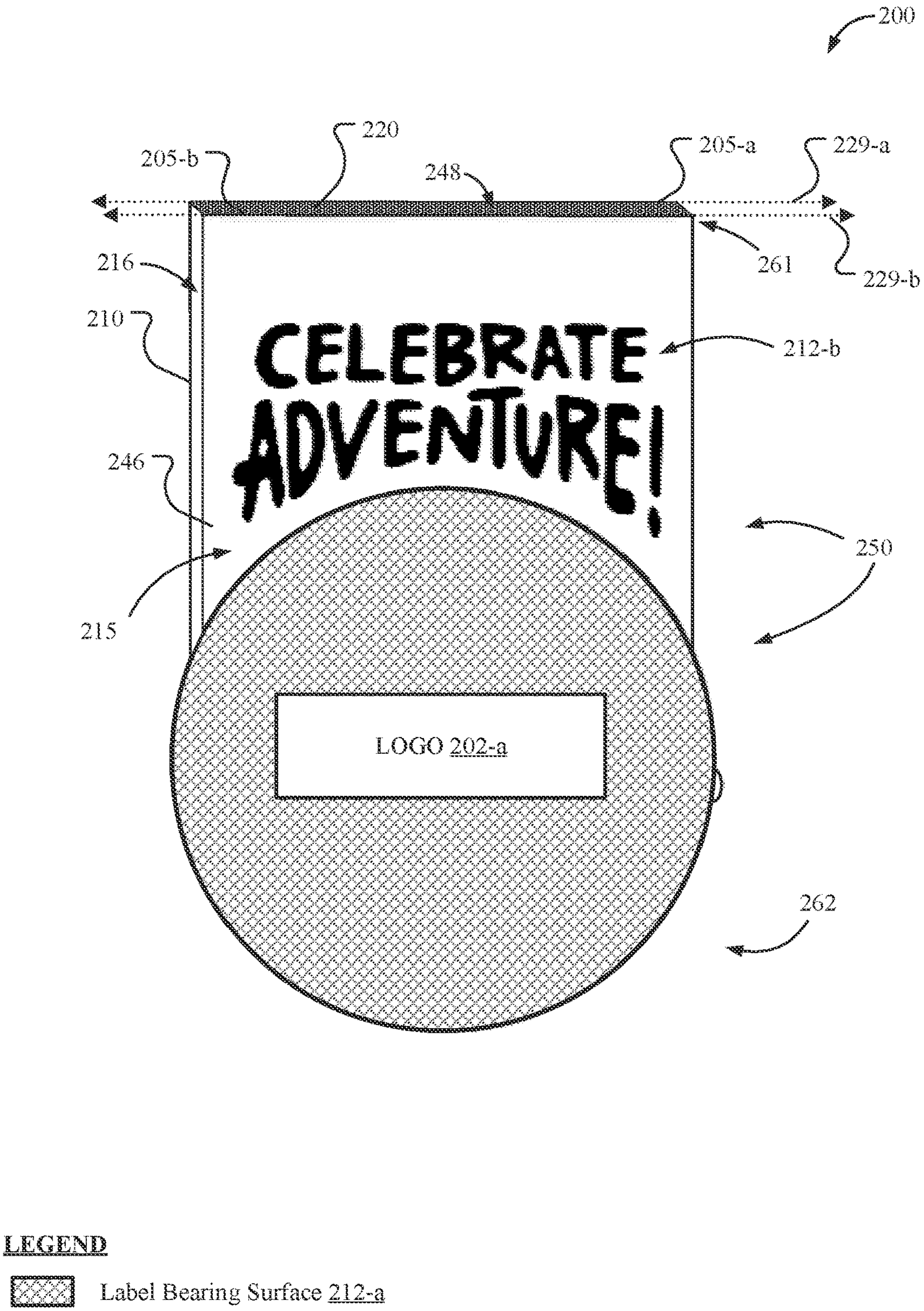
FIG. 2 illustrates a front view of the gravity hangtag in FIG. 1 in a folded position, according to an embodiment of the disclosure.
Figure 3:
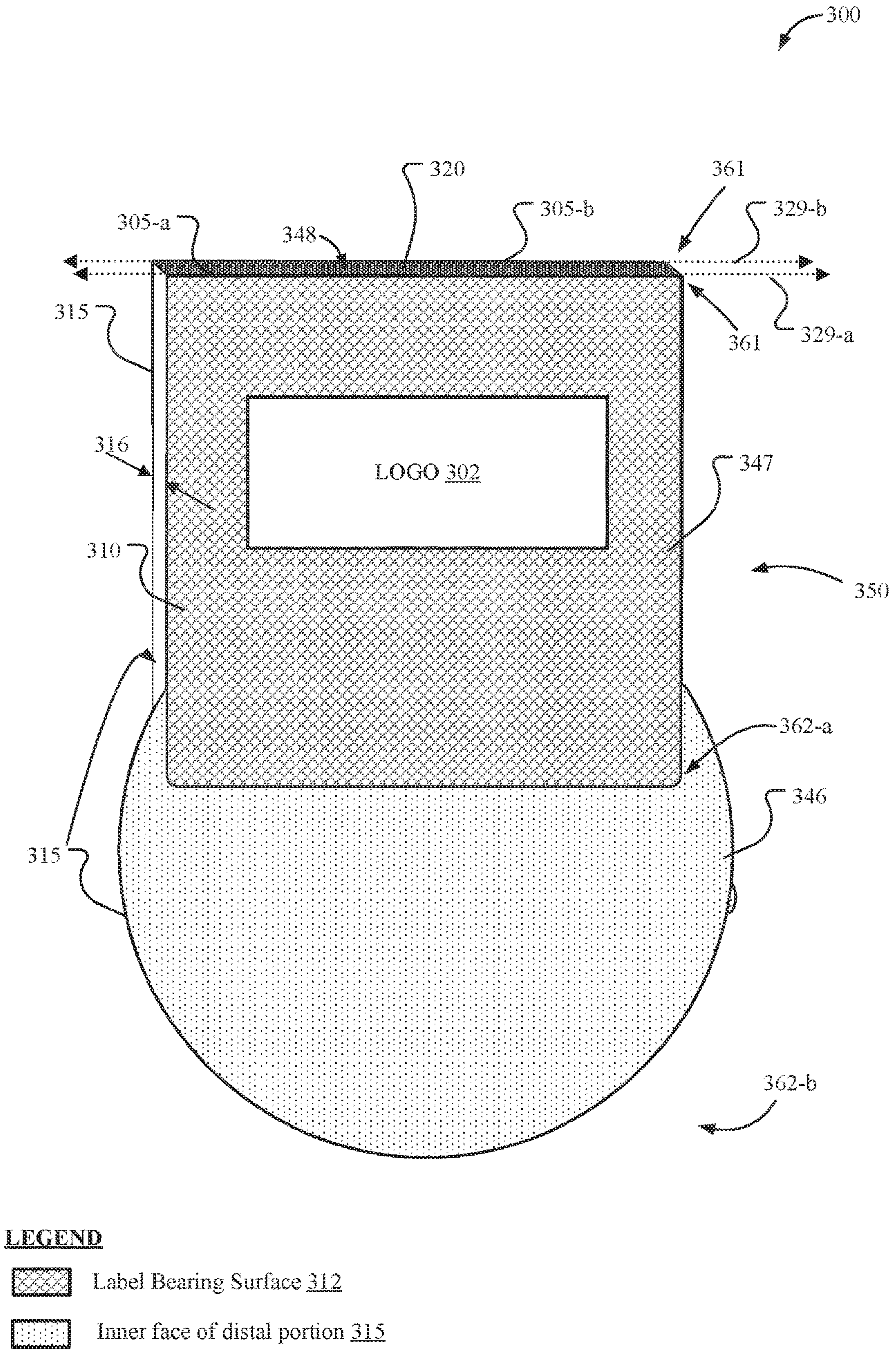
FIG. 3 illustrates a rear view of the gravity hangtag in FIG. 1 in a folded position, according to an embodiment of the disclosure.

In some embodiments, the main body 150 may be foldable, for instance, at or near the crease portion 120. The foldable main body 150 may be configured to pinch or clasp from a first position (e.g., a generally linear or unfolded position shown in FIG. 1) to a second position (e.g., a folded position shown in FIGS. 2, 5, and elsewhere). In some cases, the crease portion 120 comprises two crease edges 105-*a* and 105-*b*, where crease edge 105-*a* is adjacent a first end 161-*a* of the proximal portion 110, while crease edge 105-*b* is adjacent a first end 161-*b* of the distal portion 115. In some cases, the crease portion 120 may be of the same or substantially the same width as one or more of the first end of the distal portion and the first end of the proximal portion. In some cases, the distal or bottom portion 115 of gravity hangtag 100 may be shaped as shown in FIGS. 1-3, with a rectangular section at the first end 161-*b* (also shown as first end 261 in FIG. 2) and a curved or circular section at a second end 162-*b* (also shown as second end 262 in FIG. 2, second end 362-*b* in FIG. 3). In some examples, the curved or circular section may be unitary with the rectangular section (i.e., the distal portion may be formed as a single piece). In some embodiments, the width of the rectangular top end may be selected to be the same as the width of the crease portion 120 and/or the proximal portion 110. Further, the diameter of the circular or curved section at the second end 162-*b* may be selected to be slightly larger than the width of the rectangular top end. In one non-limiting example, the diameter of the curved or circular section may be anywhere between 1.75 and 3 inches, and for instance, around 2 inches. It should be noted, however, that other shapes and dimensions may be utilized in other embodiments, for instance, based on the particular application of the hangtag. In one non-limiting example, the crease portion of the gravity hang tag may have a trapezoidal shape, where the width of the crease edges 105-*a* and 105-*b* may be different (e.g., crease edge 105-*b* is wider than crease edge 105-*a*, or vice-versa). In such cases, the first end 161-*b* of the distal portion 115 may have the same or a similar width as the crease edge 105-*b*, while the first end 161-*a* of the proximal portion 110 may have the same or a similar width as the crease edge 105-*a*. In another non-limiting example, the crease portion 120 may have a rectangular shape (i.e., similar to the one shown in FIG. 1), but the first ends of the distal portion and/or the proximal portion may extend outward at an angle from the crease edges 105-*b* and/or 105-*a*, respectively. In other words, instead of a rectangular section (or rectangular top end), at least a part of the distal portion 115 may comprise a trapezoidal section. Further, in some cases, the proximal portion may also have a trapezoidal section in a similar manner. In yet other cases, the curved end of the distal portion 115 may be replaced with a triangular end (e.g., the distal portion may resemble a downward facing arrow), or any other shape (e.g., a wide rectangle, such that the distal portion resembles an inverted "T" shape; an irregular shape, such as a cloud or a zig-zag shape; and an oval or ellipse, to name a few non-limiting examples). FIGS. 8A-8D illustrate some non-limiting examples of alternate designs/shape that may be utilized for gravity hangtags, in accordance with one or more implementations.

Figure 4:
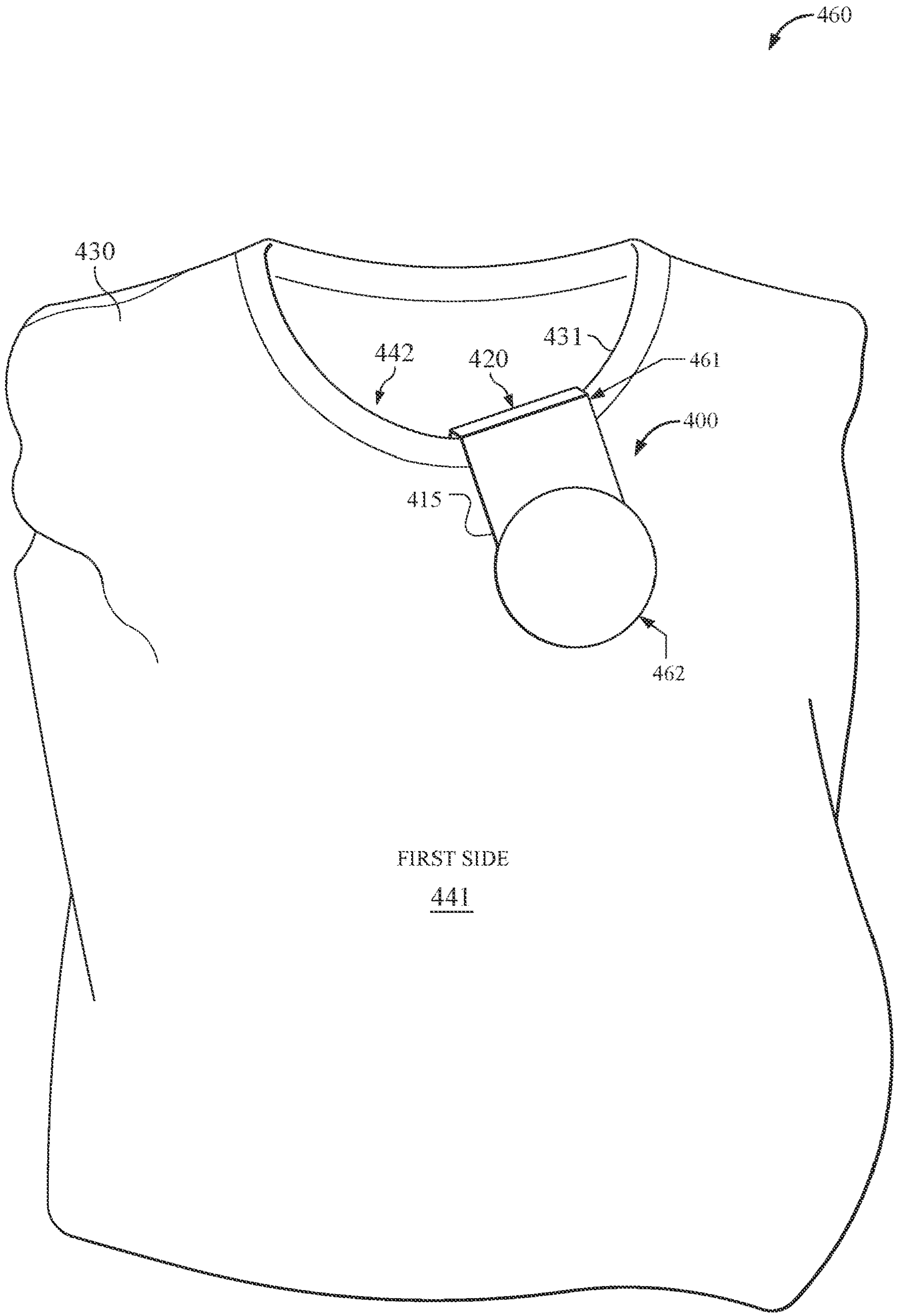
FIG. 4 illustrates a front view of a gravity hangtag mounted or placed on a product, according to an embodiment of the disclosure.
Figure 5:
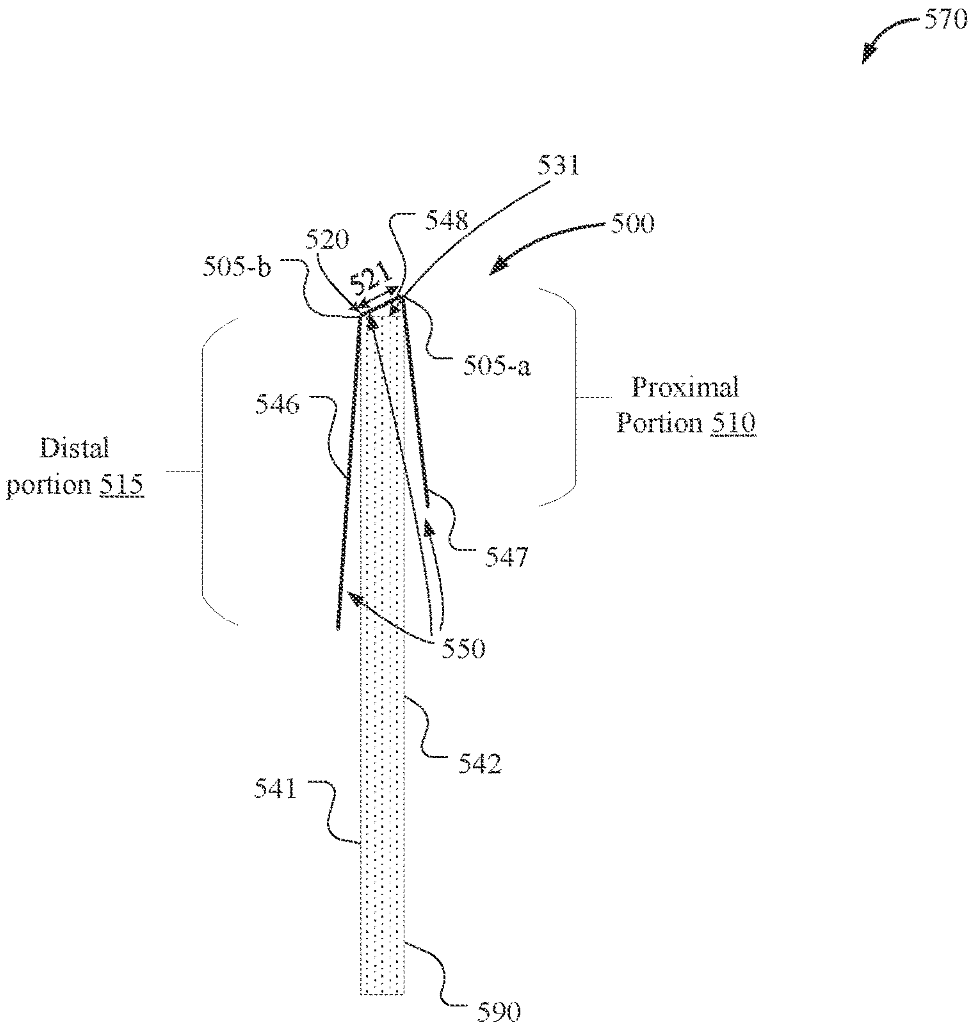
FIG. 5 illustrates an example of a cross-sectional side view of a gravity hangtag in a folded position and mounted on an article, according to an embodiment of the disclosure.

In some embodiments, the gravity hangtag 100 may be configured to fold at or near the crease portion 120 which may enable it to couple to an article (e.g., a product, such as an apparel item; a product display, such as a clothing hanger, etc.). In some cases, coupling the hangtag to a product or a product display may include mounting or placing the hangtag on at least one generally horizontal edge of the product or the product display. In some cases, the edge of the product may comprise a generally or substantially flat surface. For example, the gravity hangtag 100 may be folded in the direction shown with the arrows in FIG. 1 and subsequently mounting or placing the crease portion over a generally horizontal edge of a product, such as, but not limited to, a T-shirt collar, with the proximal portion 110 and distal portion 115 extending over opposing faces of the product, such as, but not limited to, the opposing sides of the front of a t-shirt. The different, or asymmetrical, dimensions of the proximal portion 110 (i.e., top portion) as compared to the distal portion 115 (i.e., bottom portion) of the gravity hangtag 100 may allow the hangtag to remain stable under gravity while placed on the horizontal or substantially horizontal edge of the product. In some examples, the crease portion 120 may be shaped and sized to mount the foldable main body 150 over the edge of the product such that the proximal portion 110 is adjacent a first side (e.g., an inner or interior side) of the product face while the distal portion 115 is adjacent a second, opposing side (e.g., outer or exterior side) of the same product face. In some examples, the first and second, opposing product sides may both be integrated or coupled to the edge (e.g., FIG. 5 shows bottom and top edge 531 integrated to the first product side 541 and the second, opposing product side 542). Further, returning now to FIG. 1, a length 121 of the crease portion 120, where the length 121 extends between crease edges 105-*a* and 105-*b*, may be slightly greater than the thickness of the horizontal edge (e.g., edge 531) of the product or product display adapted to receive the hangtag. In some cases, after folding the hangtag 500 and mounting the hangtag 500 on the article 590, the weight of the proximal portion 110 and the distal portion 115 may increase the downward force and/or friction applied by the crease portion 120 onto at least a portion of the generally horizontal surface/edge of the product (or the product display) and product sides 541, 542. In some examples, the proximal portion 110 and/or the distal portion 115 may be weighted. In some cases, the foldable main body 150 may be adapted to fit over multiple sides of the product or product face, for instance, the inner side and the outer side of the same product face (e.g., front face of a t-shirt), the outer side of a first product face and the outer side of a second product face (e.g., outer side of a front face of a t shirt and outer side of a rear face of the t-shirt), to name two non-limiting examples. Additionally or alternatively, the portions (e.g., crease portion 120, proximal portion 110, distal portion 115) of the foldable main body 150 may be visible from different sides of the product. For example, Turning now to FIGS. 4 and 5, which illustrate a front view and a side view, respectively, of a gravity hangtag in a folded position and coupled to (e.g., mounted on, placed on) an edge of a product. FIG. 4 illustrates a front view 460 of a gravity hangtag 400 mounted or placed on a product 430, according to an embodiment of the disclosure. In this view, the gravity hangtag 400 comprises a distal portion 415 having a first end 461 and a second end 462, and a crease portion 420. As seen, the product 430 comprises a t-shirt having a first side 441 (also shown as first side 541 in FIG. 5), a second side 442 (i.e., the inner face/side of the t-shirt closest to the torso when the t-shirt is worn), the second side 442 opposing the first side 441, and an edge 431 (the neckline) connecting the first side 441 and the second side 442 of the front of the shirt. In the example shown, the first side 441 is the side of the product 430 visible to a consumer facing the product when the consumer is determining whether to purchase the product 430, while the second side 442 is on the interior of the product and is not directly visible by the consumer in this setup.

As seen, the gravity hangtag 400 may be configured to pinch or clasp over the edge 431 of the product 430 so the weight of the proximal portion (e.g., shown as proximal portion 510 in FIG. 5) and distal portion 415 (also shown as distal portion 515 in FIG. 5), as well as any friction between crease portion 420 and the product may serve to keep the gravity hangtag stable or substantially stable relative to the product. Additional friction between the proximal portion 510 and the distal portion 515 and the product (e.g., article 590) may occur. For example, the underside (e.g., face/side of the proximal portion 510 and/or the distal portion 515 adjacent the second side and/or the first side of the product, respectively) of the proximal portion 510 and/or the distal portion 515 may contact the second side 442 and first side 441, respectively.

As illustrated by the arrows on the left side of the page in FIG. 1, the proximal portion 110 of the gravity hangtag 100 may be folded into the page (e.g., away from user) along crease edge 105-*a*, and the distal or bottom portion 115 may be folded into the page (e.g., away from user) along crease edge 105-*b*, such that a separate surface/plane is formed for crease portion 120 as compared to the surfaces/planes for the distal and proximal portions. In some cases, the width of the crease portion 120 may be anywhere between 0.15 to 0.40 inches, for instance, around 0.25 inches. In some cases, the crease portion 120 may comprise text (e.g., directly printed onto the crease portion) or a label (e.g., affixed or glued to the crease portion 120) viewable to a customer.

FIG. 5 illustrates a cross-sectional side view 570 of a gravity hangtag 500 mounted or placed on an article 590, according to an embodiment of the disclosure. In some examples, the article 590 may comprise a product (e.g., shown as product 430 in FIG. 4), or alternatively a product display (e.g., a clothing hanger, or another applicable item). Some non-limiting examples of a product may include an apparel item, a package or box holding a retail item, a CD cover, etc. In some examples, the product display may include a clothing hanger. In the example shown, the article 590 comprises a first side 541 (also shown as first side 441 in FIG. 4), a second side 542 (also shown as second side 442 in FIG. 4), the second side 542 opposing the first side 541, and an edge 531 connecting the first side 541 and the second side 542. In some examples, the relative dimensions (e.g., thicknesses, lengths, etc.) of the different elements shown in FIG. 5 and the other figures herein may be exaggerated to illustrate and describe aspects of the present disclosure more clearly. As seen, the gravity hangtag 500 in FIG. 5 comprises a foldable main body 550, which may be similar or substantially similar to the foldable main body described in relation to FIG. 1 or any of the other figures described herein. In some embodiments, the foldable main body 550 comprises a distal portion 515, a proximal portion 510, and a crease portion 520 positioned between and coupled or integrated to the distal portion 515 and the proximal portion 510. In some cases, the crease portion 520 may comprise two crease edges 505-*a* and 505-*b*, where the crease edge 505-*a* may be adjacent the proximal portion 510 and the crease edge 505-*b* may be adjacent the distal portion 515. The crease edges 505-*a* and 505-*b* may be separated by a first length 521, where the first length 521 may be slightly greater than the thickness of the edge 531 of the article 590. In this way, when the foldable main body 550 is folded at or near the crease portion 520, for instance, at the crease edges 505-*a* and 505-*b*, the crease portion 520 may be configured to rest over the edge 531 of the product, and at least part of the proximal portion 510 and the distal portion 515 may be configured to frictionally engage a respective side 542 or 541 of the article 590. As seen, in some examples, the foldable main body 550 is configured to pinch or clasp over the edge 531 of the product such that each of the distal portion 515 and the proximal portion 510 are angled with respect to the crease portion 520.

In some cases, the crease portion 520 comprises a crease surface 548. Further, the proximal portion 510 comprises a proximal surface 547 and the distal portion 515 comprises a distal surface 546. The foldable main body 550 is configured to pinch or clasp from a first position (e.g., a generally linear or unfolded position, as seen in FIG. 1) to a second position (e.g., a folded position, as seen in FIGS. 2-7). The crease surface 548 may comprise a first plane, the proximal surface may comprise a second plane, and the distal surface may comprise a third plane, where the first, second, and third planes are different. In some cases, for instance, after folding the foldable main body, the second and third planes may be generally parallel to each other and/or generally perpendicular to the first plane. Alternatively, and as seen in FIG. 5, the second plane (i.e., of the proximal surface) and the third plane (i.e., of the distal surface) may be angled relative to the first plane.

In some cases, crease portion 520 comprises the first crease edge 505-*a* for receiving a first fold of the main body and the second crease edge 505-*b* for receiving a second fold of the main body. Further, the first crease edge 505-*a* comprises a first pivot axis for the first fold and the second crease edge 505-*b* comprises a second pivot axis for the second fold. As seen, the proximal portion 510 is rotatably coupled to the crease portion 520 via the first crease edge 505-*a*, with the proximal portion 510 being configured to rotate about this first pivot axis. Similarly, the distal portion 515 is rotatably coupled to the crease portion 520 via the second crease edge 505-*b* and configured to rotate about the second pivot axis created by the second crease edge 505-*b*.

In some cases, when the foldable main body is pinched or clasped from the first position (e.g., the unfolded position seen in FIG. 1) to the second position (e.g., the folded position seen in FIG. 5) and the hangtag 500 is at least one of placed on and coupled to the article 590, the proximal surface 547 and the distal surface 546 extend below the crease surface 548. Further, the main body 550 remains generally stable on the article 590 by the weight of the proximal portion 510 and the distal portion 515 applying a force (e.g., a downward force) from the crease surface 548 onto at least a portion of the generally horizontal surface of the product or product display. Additionally or alternatively, the weight of the proximal portion 510 and the distal portion 515 serve to apply a frictional force between the crease surface 548 and the horizontal surface/edge 531 of the article 590.

Returning to FIG. 1, in some examples, the distal portion 115 and/or the proximal portion 110 of the gravity hangtag 100 may comprise label bearing surfaces 112. The proximal portion and/or the distal portion may also comprise labels and/or logos (e.g., logo 102-*a*, logo 102-*b*, logo 102-*c*) that may cover a majority of their surfaces (e.g., >90% of the label bearing surface 112 on any portion). In some embodiments, the labels, logos, etc., may also be wrapped around the backside (the opposing side of the main body 550 seen in FIG. 1) of the hangtag 100 if desired to provide more information concerning the product and/or the manufacturer. In one non-limiting example, a portion of the gravity hangtag 100 may comprise text, such as an inspirational for the customer. Additionally or alternatively, a portion may also comprise social media information (e.g., FACEBOOK, INSTAGRAM, TWITTER, etc.) for the brand. In other cases, a portion may comprise social media information, where the social media information may include a URL or a scannable code, such as an optional Quick Response (QR) code 104 (shown as optional by the dashed lines). Additionally or alternatively, the distal portion 115 may also comprise a scannable bar code 106, where the bar code 106 may include pricing information for the product. In some embodiments, the crease portion 120 may also comprise one or more of a text (e.g., "Smile Connect Share"), a logo, a brand or company name, or any other information specific to the product, the company, and/or the brand, to name a few non-limiting examples.

FIG. 2 illustrates a front view of a gravity hangtag 200 in a folded position, according to an embodiment of the disclosure. The gravity hangtag 200 may be similar or substantially similar to the gravity hangtag 100 described in relation to FIG. 1, or any of the other gravity hangtags described herein. Gravity hangtag 200 comprises a foldable main body 250 with the foldable main body 250 comprising a distal portion 215, a proximal portion 210, a crease portion 220 positioned between the distal portion and the proximal portion, at least one label bearing surface 212 (e.g., label bearing surface 212-*a*, label bearing surface 212-*b*), and a logo 202-*a* (e.g., printed on or affixed to the label bearing surface 212-*a*). In some examples, the logo 202-*a* may comprise a brand or company logo for a product adapted to receive the gravity hangtag 200. In some cases, the crease portion 220 may comprise a first crease edge 205-*a* for receiving a first fold of the main body 250 and a second crease edge 205-*b* for receiving a second fold of the main body 250. The first crease edge 205-*a* and the second crease edge 205-*b* may be located adjacent, and/or integrated with, the proximal portion 210 and the distal portion 215, respectively. The foldable main body 250 may be configured to be folded at or near the crease edges 205, which may enable the gravity hangtag 200 to be mounted or placed over a horizontal (or substantially horizontal edge) of a product. In some cases, when the gravity hangtag 200 is folded, the proximal portion 210 and the distal portion 215 may be separated by a gap 216 (e.g., an air gap) between the proximal portion 210 and the distal portion 215. It should be noted that, the gap 216 may or may not be uniform (i.e., the distal portion and the proximal portion may or may not be parallel). For instance, the gap 216 may be narrower (e.g., may taper) near the second ends of the proximal and distal portions of the gravity hangtag 200. Alternatively, the gap 216 may be narrower near the first ends of the proximal and distal portions and may diverge or become broader near the second ends (162-*a* & 162-*b* in FIG. 1) of the proximal and distal portions. In yet other cases, the gap 216 may be configured to be roughly uniform. In some cases, the dimensions of the gap 216 (which may be related to the length 121) may be based and/or adjusted (along with the length 121) in part on one or more of a rigidity or elasticity of the material used to form the gravity hangtag, the force applied to pinch or clasp the hangtag over the edge of the product, the thickness of the generally or substantially horizontal edge of the product relative to the crease portion 220 length 121, and the relative weights of the distal portion 215 and the proximal portion 210, to name a few non-limiting examples.

As seen, the crease portion 220 comprises a crease surface 248. Further, the distal portion comprise a distal surface 246 and the proximal portion comprises a proximal surface (e.g., shown as proximal surface 347 in FIG. 3). As previously noted, the foldable main body 250 is configured to pinch or clasp from a first position to a second position, where the first position comprises a generally linear position. Further, in the second, folded, position (as shown with one example in FIG. 2), the crease surface 248 comprises a first plane, the proximal surface comprises a second plane, and the distal surface 246 comprises a third plane, where the first, second, and third planes are different. In some cases, the second and third planes (i.e., of the proximal surface and the distal surface 246) comprise one of generally and substantially parallel planes, and planes one of substantially and generally perpendicular to the first plane (i.e., of the crease surface 248). In some examples, the first crease edge 205-*a* comprises a first pivot axis 229-*a* for the first fold and the second crease edge 205-*b* comprises a second pivot axis 229-*b* for the second fold. Further, the proximal portion 210 in one embodiment is rotatably coupled to the crease portion 220 via the first crease edge 205-*a* and configured to rotate about the first pivot axis 229-*a*, and the distal portion 215 is rotatably coupled to the crease portion via the second crease edge 205-*b* and configured to rotate about the second pivot axis 229-*b*.

FIG. 3 illustrates a rear view of the gravity hangtag 200 seen in FIG. 2. As seen in FIG. 3, the gravity hangtag 300 is in a folded position. The gravity hangtag 300 may also be similar or substantially similar to the gravity hangtag 100 described in relation to FIG. 1, or any of the other gravity hangtags described herein. Gravity hangtag 300 comprises a foldable main body 350, the foldable main body 350 comprising a distal portion 315, a proximal portion 310, a crease portion 320 positioned between the distal portion and the proximal portion, and at least one label bearing surface 312 having a logo 302. In some examples, the logo 302 may be printed on or affixed to the label bearing surface 312 and may be similar or substantially similar to the logos 102 described elsewhere herein. In some examples, the logo 302 may be an example of a brand or company logo for a product (e.g., an apparel item such as a t-shirt, a disc cover, or any other product having at least one generally horizontal edge) adapted to receive the gravity hangtag 300. In some cases, the crease portion 320 comprises a first crease edge 305-*a* and a second crease edge 305-*b*, where the first and the second crease edge receive a first and a second fold, respectively, of the main body 350. As seen, the first crease edge 305-*a* is located adjacent the proximal portion 310 while the second crease edge is located adjacent the distal portion 315. In some cases, the proximal portion 310 is (i) rotatably coupled to the crease portion at a first end 361 via the first crease edge, and (ii) configured to rotate about a first pivot axis 329-*a*, where the first pivot axis 329-*a* serves to enable the first fold of the main body. Similar, the distal portion is (i) rotatably coupled to the crease portion 320 at a first end (e.g., 261 in FIG. 2) via the second crease edge 305-*b* and (ii) configured to rotate about a second pivot axis 329-*b*, where the second pivot axis 329-*b* serves to enable the second fold of the main body. As seen, the crease portion 320 also comprises a crease surface 348. Further, the distal portion 315 comprise a distal surface 346 and the proximal portion comprises a proximal surface 347. As previously noted, the foldable main body 350 is configured to pinch or clasp from a first position to a second position, where the first position comprises a generally linear position. Further, in the second position (as shown in FIG. 3), the crease surface 348 comprises a first plane, the proximal surface 347 comprises a second plane, and the distal surface 346 comprises a third plane, where the first, second, and third planes are different. In some cases, the second and third planes (i.e., of the proximal surface 347 and the distal surface 346) comprise one of generally and substantially parallel planes, and planes one of substantially and generally perpendicular to the first plane (i.e., of the crease surface 348).

As shown, the foldable main body 350 is configured to be folded at or near the crease edges 305, enabling the gravity hangtag 300 for mounting to, placement on, and/or coupling with horizontal (or substantially horizontal) edge of a product. In some cases, when the gravity hangtag 300 is folded, the proximal portion 310 and the distal portion 315 may be separated by a gap 316 (e.g., a gap comprising air and/or or a portion of a product 430). It should be noted that the gap 316 may or may not comprise a uniform distance along the length of the proximal portion 310 and/or distal portion (e.g., from the first end 361 to the second end 362-*a*). As such, the distal portion and the proximal portion may or may not be parallel when in the folded position. In one such embodiment, the gap 316 may comprising a tapering gap wherein the gap is narrower near the second ends 362-*a*, 362-*b* of the proximal and distal portions of the gravity hangtag 300 as compared to the first ends 361. Alternatively, the gap 316 may be narrower near the first ends 361 of the proximal and distal portions and may diverge or become broader near the second ends 362-*a*, 362-*b* of the proximal and distal portions. In yet other cases, the selection of material for the foldable main body 350, or other features of the body 350, may enable the gap 316 to be roughly uniform. In some cases, the dimensions of the gap 316 may be based in part on one or more of a rigidity or elasticity of the material used to form the gravity hangtag 300, the force applied to pinch or clasp the hangtag over the edge of the product, the thickness of the product, and the relative weights of the distal portion 315 and the proximal portion 310, to name a few non-limiting examples. Once the gravity hangtag 300 is folded and placed over an edge of the product, the edge of the product may be received within the gap 316. In some embodiments, an overall length of the distal portion 315 may be longer than an overall length of the proximal portion 310 (or vice versa). For instance, an inner face of the distal portion (i.e., shown by the lightly shaded dots) may extend past the second end 362-*a* of the proximal portion, as depicted in FIG. 3. Generally, equal-lengths for proximal portion 310 and distal portion 315 are also contemplated.

In some cases, each of the first crease edge 305-*a* and the second crease edge 305-*b* comprise the same or substantially the same width and length, though different widths and lengths are contemplated. The first and second crease edge are also separated by a length. In one embodiment, the length between the crease edges may substantially comprise the length of the crease portion 320. In some cases, the first and the second crease edge may have the same thickness. In other cases, the first crease edge and the second crease edge may have a different thickness (e.g., the first crease edge 305-*a* may be thicker than the second crease edge 305-*b*, or vice-versa; or the first crease edge and second crease edge may comprise a smaller thickness as compared to the remainder of the foldable main body 350.). In some examples, the main body 350 comprises a main body edge (e.g., along an outer perimeter of the main body 350) having a thickness, where the thickness may be anywhere between 1 millimeter (mm) to 10 mm. In other cases, the thickness of the main body edge may be more than 10 mm, for instance, around 15 mm, around 18 mm, etc. Further, the length of the crease portion 320 may comprise a larger distance than the thickness of the main body edge. It should be noted that, the thickness of the main body edge may or may not be uniform. For instance, the main body may be thicker near the second ends 362-*a*, 362-*b* of the proximal and distal portions (e.g., along the crease lines) as compared to the first ends 361. Alternatively, the main body edge may have a first thickness at the distal portion, a second thickness at the crease portion, and a third thickness at the proximal portion, where one or more of the thicknesses may be the same. Alternatively, the first, second, and third thicknesses may be different.

In some embodiments, the gravity hangtag may be composed of a single material, such as cardboard, paper, silicone, rubber, wood, metal, plastic, bamboo, canvas, cotton twill, leather, and/or woven material, etc. In some examples, the gravity hangtag may be composed of recycled materials or recyclable materials, such as recycled or recyclable paper. In some other cases, one or more of the proximal portion (e.g., proximal portion 110), the distal portion (e.g., distal portion 115), and the crease portion (e.g., crease portion 120) may be composed of a different material. For instance, at least a portion of the crease portion may be composed of a stiffer (less elastic) material than the proximal and distal portions. Alternatively, the crease portion may be composed of a more elastic material than the proximal (i.e., top) and distal (i.e., bottom) portions. One or more sections or portions of the hangtag may comprise different, or the same, materials and the remainder of the hangtag. In some cases, at least part of the top and bottom portions may be composed of a magnetic material and/or may comprise magnetic tips at their top end and/or bottom ends (first and second ends), respectively, further described in relation to FIGS. 9A-9B. In such cases, the top and/or bottom portions (or other portions/sections) of the hangtag may clasp together firmly when the hangtag is coupled to a product or a product display.

While using magnetic tips, the top and bottom portions may comprise a similar in length to facilitate attachment of the gravity hangtag (e.g., shown as gravity hangtag 900-*a*, gravity hangtag 900-*b*) to the product or the product display. In yet additional embodiments, a rear surface of the hangtag (e.g., shown as gravity hangtag 900-*a*) may comprise an adhesive material adapted to help couple the hangtag to a garment or other retail item. In one such embodiment, the hangtag described herein may comprise a first removable outer layer comprising a sticker or a removable polymeric material and a second adhesive layer of material may reside under the sticker/removable polymeric material adapted for sticking to/coupling to the retail item. For instance, in FIG. 3, after removal of the first outer layer (not shown) on the inner face of the distal portion 315, the second adhesive layer (e.g., shown by the lightly shade dots) may be revealed, which may enable the gravity hangtag 300 to be coupled to a retail item. In some cases, an inner face (not visible) of the proximal portion may also comprise an outer removable layer and an inner adhesive layer, which may facilitate in securely mounting the hangtag 300 to a product or a product display. In some cases, the adhesive material may be placed on both the front and rear surfaces of the hangtag 900-*b* and on the crease portion surface coupled to and/or placed on the edge. Further, the adhesive material may cover all or a substantial portion (e.g., >70%, >90%, etc.) of the front and rear surfaces of the hangtag 900-*b*. In some examples, the adhesive material on the inner/rear surface of the hangtag 900-*b* may be used to help couple the hangtag to the garment or retail item, while a removable sticker (e.g., shown as logo 102-*c* on label bearing surface 112 in FIG. 1) having an adhesive material may be stuck on to the front surface and may be used for product promotion. For instance, a sticker on the front surface of the tag 900-*b* may be removed (e.g., by a customer) and stuck on to a surface of a different product, such as, but not limited to, a fridge, a vehicle bumper, a skateboard, a snowboard, a helmet, a laptop, etc. In yet other cases, the hangtag 900-*b* may be a sticker having one or more logos and label bearing surfaces on the front/outer surface and an adhesive layer and a removable layer on the rear/inner surface. In such cases, the removable layer on the rear/inner surface may be removed, thus exposing the adhesive/sticky material. The hangtag may then be mounted or stuck onto the product or product display. Alternative coupling mechanisms known in the art such as static electricity inducing layers are also contemplated.

Figure 6:
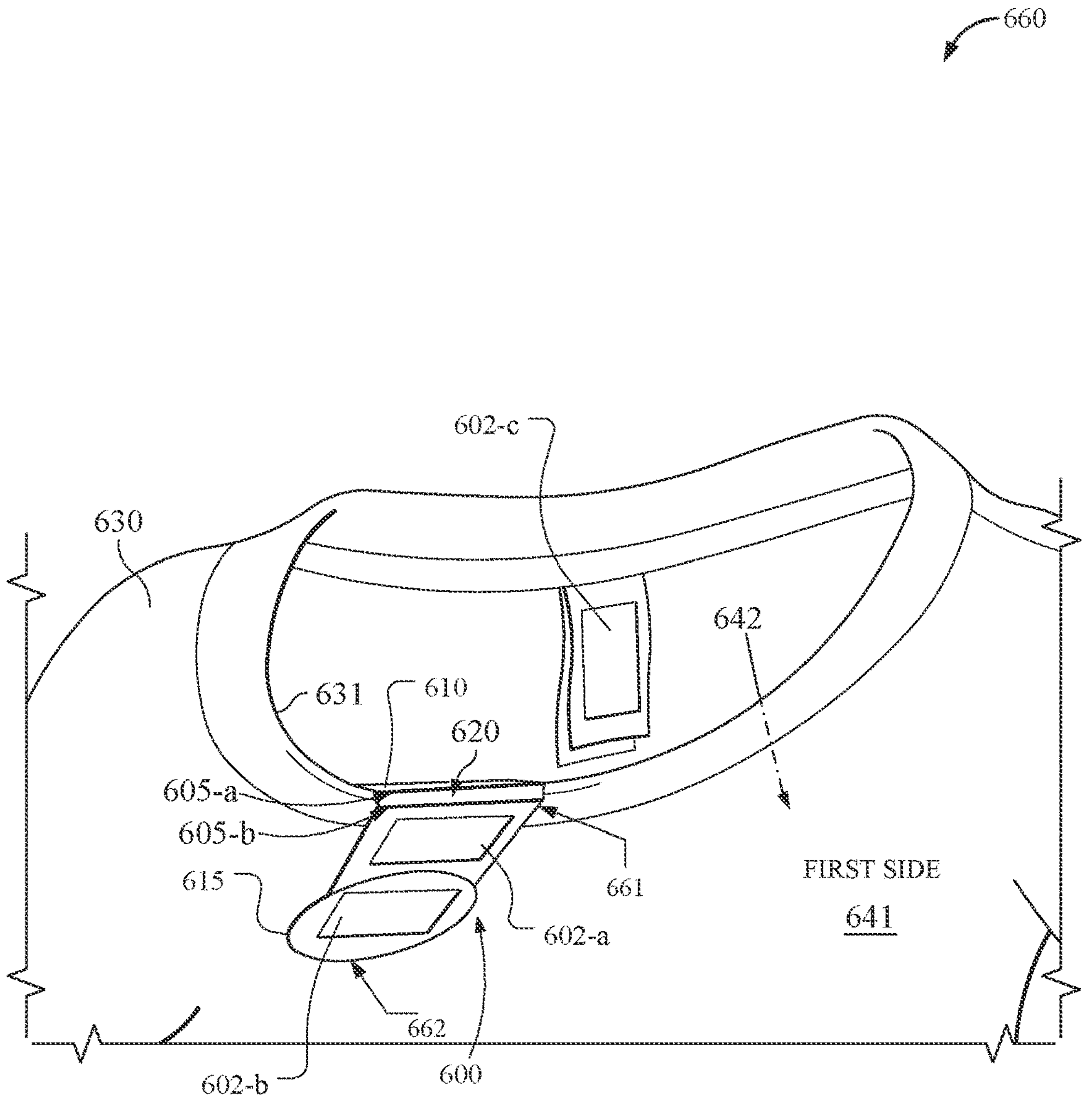
FIG. 6 illustrates a top-perspective view of a gravity hangtag in a folded position and mounted on a product, according to an embodiment of the disclosure.
Figure 7:
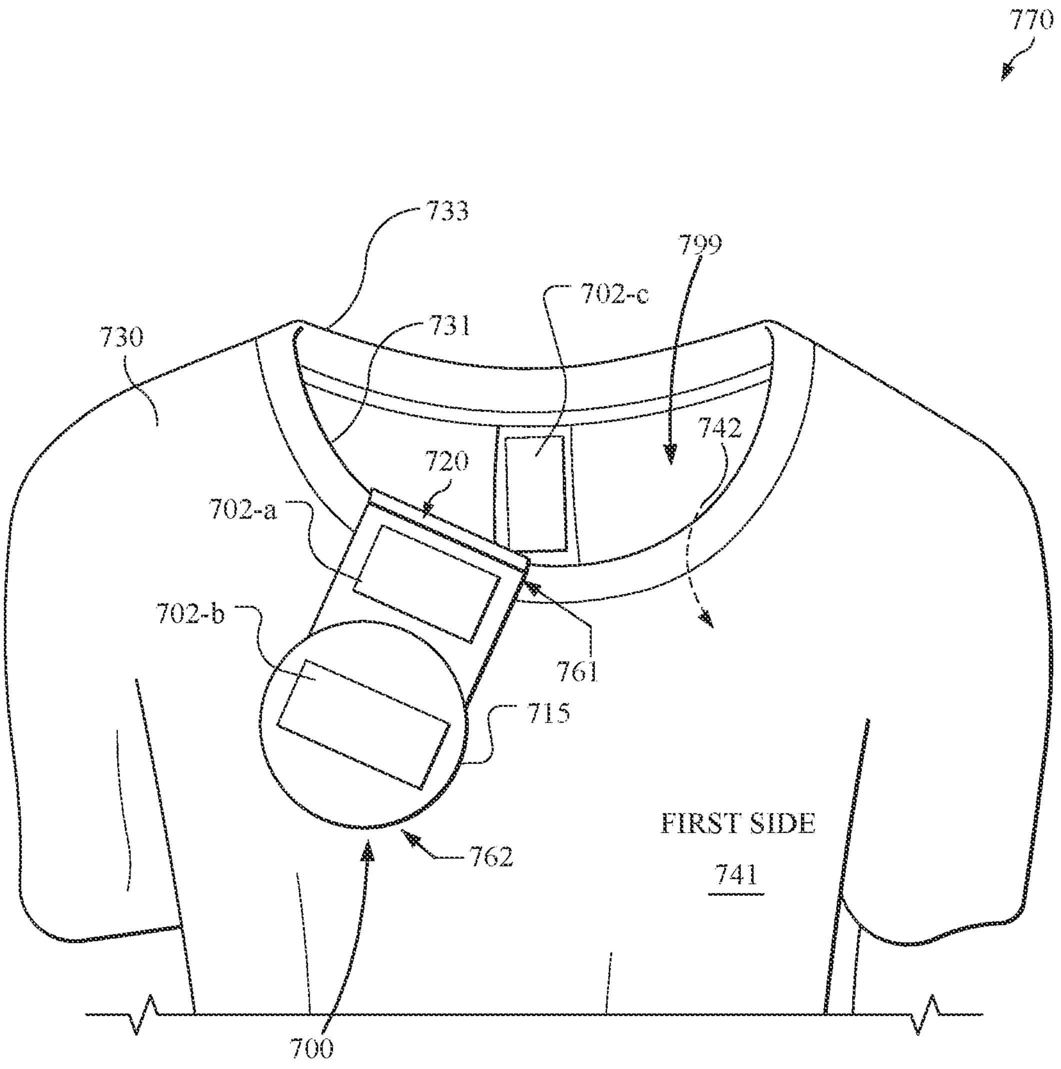
FIG. 7 illustrates another front view of a gravity hangtag in a folded position and mounted on a product, according to an embodiment of the disclosure.

FIGS. 6 and 7 illustrate a top perspective view and a front view, respectively, of the foldable gravity hangtag of FIG. 1 and elsewhere as described herein in its folded layout, in accordance with at least one embodiment of this disclosure.

First turning to FIG. 6, this figure illustrates a top perspective view 660 of a gravity hangtag 600 in its folded layout and coupled to a product 630, according to an embodiment of the disclosure. The gravity hangtag 600 may be similar or substantially similar to the gravity hangtag 100 in FIG. 1, or any of the other gravity hangtags described herein. As shown, gravity hangtag 600 may be folded over a generally horizontal edge 631 of a product 630, such as the collar or front edge of a t-shirt. In one embodiment, the gravity hangtag 600 comprises a foldable main body (e.g., shown as foldable main body 350 in FIG. 3) with the foldable main body comprising a distal portion 615 having a first end 661 and a second end 662, a proximal portion 610, a crease portion 620 positioned between the distal portion and the proximal portion, and at least one label bearing surface (e.g., shown as label bearing surface 312 in FIG. 3) having a logo 602 (e.g., logo 602-*a*, logo 602-*b*). In some examples, the logo 602 may be printed on or affixed to the label bearing surface and may be similar or substantially similar to the logos 102 described in relation to FIG. 1 or elsewhere herein. In some examples, the logos 602-*a* and/or 602-*b* may be examples of a brand or company logo for the t-shirt adapted to receive the gravity hangtag 600. In some cases, the product 630 may also comprise a logo 602-*c*, where the logo 602-*c* may be printed on a label/tag directly coupled to the product. In some cases, the logo 602-*c* may also include a brand name, a size, or any other relevant information specific to the product 630.

In some cases, the crease portion 620 may comprise two crease edges 605-*a* and 605-*b*, the crease edges 605 separated by a crease length. In some embodiments, the crease length may be greater than the thickness of the edge 631. As seen, the edge 631 may comprise a horizontal or substantially horizontal edge and may couple or integrate to both a first outer side 641 and a second inner side 642 (as shown by the dashed element line) of the t-shirt. The foldable main body may be configured to fold at or near the crease edges 605, which may enable the gravity hangtag 600 to be mounted or placed over the horizontal (or substantially horizontal edge 631) of the t-shirt. The gravity hangtag 600 may be configured to remain stable or substantially stable with respect to the product 630 under gravity. For instance, the crease portion 620 may be configured to contact at least a portion of the substantially horizontal edge 631 of the product. The frictional engagement of the crease portion 620 with the edge 631 may enable the gravity hangtag 600 to rest in a substantially or generally stable arrangement relative to the t-shirt. Additionally or alternatively, at least one of the inner surface of the distal portion and the proximal portion may be in frictional engagement with the first side 641 and the second side 642, respectively, of the product 630. In yet other cases, one or more of the inner surface of the proximal portion, the crease portion, and the distal portion may comprise an adhesive layer or other coupling mechanism, where the adhesive layer or other coupling mechanism may also assist in keeping the gravity hangtag 600 stable with respect to the product. In some cases, the weight of the proximal portion and the distal portion may also help apply a downward force from the crease portion or crease surface (e.g., shown as crease surface 248 in FIG. 2) onto the generally horizontal edge 631, as well as a frictional force between the crease surface and the edge 631.

FIG. 7 illustrates a front view 770 of a gravity hangtag 700 in its folded layout and placed on an edge 731 of a product 730. Here, the edge comprises an edge at an angle (less than a 45-degree angle). In this example, the product 730 also comprises a t-shirt. It should be noted that the gravity hangtag 700 may be utilized with any other applicable item with at least one edge, for instance, a product display (e.g., a clothing hanger for the product 730). Some non-limiting examples of products and/or locations on which the gravity hangtag 700 may be placed include apparel items (e.g., pocket of a coat, jacket, suit, button down shirt, trousers, jeans, etc.), a compact disc (CD) cover, a book, food container or storage box, a rigid or semi-rigid package (e.g., a cardboard box containing an electronic item, such as a smartphone, earphones, etc.), or any other applicable product or location.

As shown, gravity hangtag 700 is folded and placed on a horizontal edge 731 of the product 730, such as the neck/collar of a t-shirt. The gravity hangtag 700 comprises a foldable main body (e.g., shown as foldable main body 350 in FIG. 3), the foldable main body comprising a distal portion 715 having a first end 761 and a second end 762, a proximal portion (not visible, but shown as proximal portion 610 in FIG. 6), a crease portion 720 positioned between the distal portion and the proximal portion, and at least one label bearing surface (e.g., shown as label bearing surface 312 in FIG. 3) having a logo 702 (e.g., logo 702-*a*, logo 702-*b*). In some examples, the logo 702 may be printed on or affixed to the label bearing surface and may be similar or substantially similar to the logos 102 described in relation to FIG. 1. In some cases, the product 730 may also comprise a logo 702-*c*, where the logo 702-*c* may be printed on a label/tag directly coupled to the product. In some cases, the logo 702-*c* may also include a brand name, a size, or any other relevant information specific to the product 730.

In some cases, the crease portion 720 (more clearly visible as crease portion 320 in FIG. 3) may comprise two crease edges (e.g., shown as crease edges 305-*a* and 305-*b* in FIG. 3) with the crease edges separated by a crease length. In some embodiments, the crease length may be greater than the thickness of the edge 731. The edge 731 may be generally or substantially horizontal or may comprise an edge at an angle to the horizontal at less than 45 degrees and may couple or integrate to both a first outer side 741 and a second inner side 742 (shown as inner side 642 in FIG. 6) of the t-shirt. The foldable main body may be configured to fold at or near the crease edges, which may enable the gravity hangtag 700 to be mounted or placed over the horizontal (or substantially horizontal edge 731) of the t-shirt. The gravity hangtag 700 may be configured to remain stable or substantially stable with respect to the product 730 under gravity. For instance, the crease portion 720 may be configured to contact at least a portion of the edge of the product. The frictional engagement of the crease portion 720 with the edge 731 may enable the gravity hangtag 700 to rest in a substantially stable arrangement relative to the product 730. Additionally or alternatively, at least one of the inner surface of the distal portion and the proximal portion may be in frictional engagement with the first side 741 and the second side, respectively, of the product 730. In yet other cases, one or more of the inner surface of the proximal portion, the crease portion, and the distal portion may comprise an adhesive layer, where the adhesive layer may also assist in keeping the gravity hangtag 700 stable with respect to the product. In some cases, the proximal and distal portion may comprise magnetic tips or ends which may assist in clasping the hangtag over the product.

In some examples, in order to mount the hangtag 700 over the edge 731, the proximal or top portion of the hangtag may be folded above the first crease edge (e.g., first crease edge 105-*a* in FIG. 1), and the distal or bottom portion may be folded below the second crease edge (e.g., second crease edge 105-*b*). In such cases, crease portion 720 may be formed and defined between the parallel or substantially parallel crease edges, which may facilitate placement of the hangtag 700 on the product 730. Following folding, the front portion (i.e., bottom or distal portion 715) of the gravity hangtag 700 may be visible to a consumer viewing a product first side 741, where the front portion comprises a label or logo 702-*b* displaying information about the product or the brand to the customer, a product price, etc. Further, the crease portion 720 (also referred to as the edge portion) may also be visible to a customer viewing the product. With the hangtag 700 coupled to the product in the manner shown in FIG. 7, where the proximal portion is placed between the second side 742 comprising an interior front side and a third side 799 where the third side 799 comprises an interior rear side, one or more surfaces of the proximal or top portion (also referred to as the inner portion) may only be viewable upon removal of the proximal portion from being located between these two sides, which may comprise separating the crease portion 720 from the edge 731 (e.g., removing the hangtag 700 from the product 730) and/or separating the second side 742 from the third side 799. It is also contemplated that another hangtag (not shown) may be placed on another edge, such as rear edge 733 of the product such that the distal or bottom portion of the other hangtag is displayed to a viewer of the rear of the t-shirt, while the proximal or top portion is viewable to a consumer looking at the front or first side 741 of the t-shirt. In this way, the viewer at the front of the t-shirt may be able to view both the proximal portion of the other hangtag (not shown) and the distal portion of the hangtag 700 without at least partially removing either of the gravity hangtags from the product or separating product sides.

Turning now to FIGS. 8A-8D, these figures illustrate some examples of alternate designs/shapes that may be utilized for gravity hangtags, in accordance with one or more implementations. Other designs/shapes are also contemplated. Gravity hangtags 800 (e.g., gravity hangtags 800-*a*, 800-*b*, 800-*c*, and 800-*d*) implement one or more aspects of gravity hangtag 100, or any of the other gravity hangtags described herein.

Figure 8A:
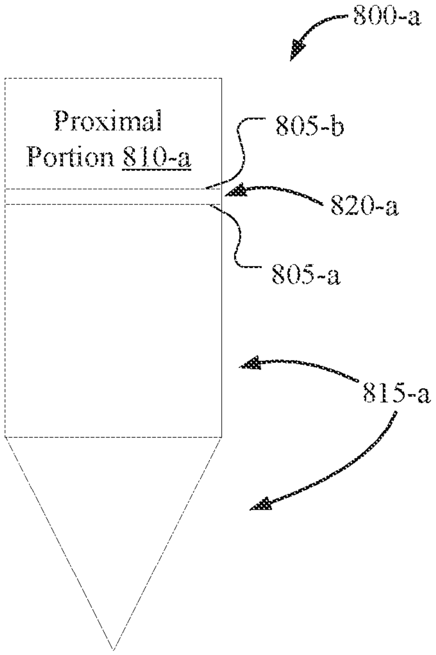
FIG. 8A illustrates an example of a gravity hangtag, according to an alternate embodiment of the disclosure.

FIG. 8A illustrates an example of a gravity hangtag 800-*a* having a proximal portion 810-*a*, a crease portion 820-*a* having two crease edges 805-*a* and 805-*b*, and a distal portion 815-*a* having a rectangular section/end and a triangular section comprising a triangular end. Specifically, the distal portion 815-*a* of the gravity hangtag 800-*a* comprises a first end adjacent the crease portion 820-*a*, where the first end has a rectangular shape. Additionally, as seen, the second end of the distal portion 815-*a* comprises a triangular shape (i.e., unlike the curved or circular section seen in the preceding figures).

Figure 8B:
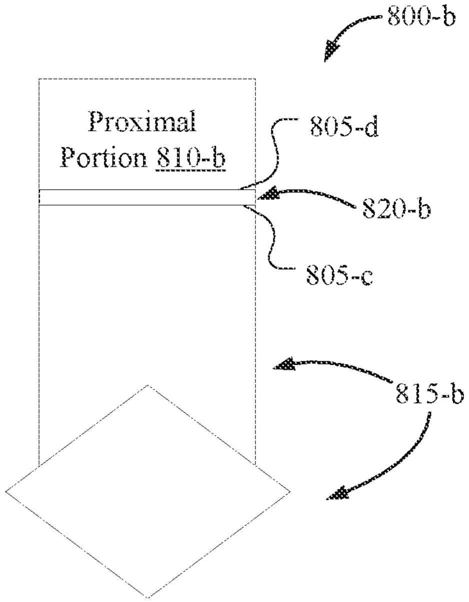
FIG. 8B illustrates an example of a gravity hangtag, according to an alternate embodiment of the disclosure.

FIG. 8B illustrates another example of a gravity hangtag 800-*b* having a proximal portion 810-*b*, a crease portion 820-*b* having two crease edges 805-*c* and 805-*d*, and a distal portion 815-*b* having a diamond end. Specifically, the distal portion 815-*b* of the gravity hangtag 800-*b* comprises a first end adjacent the crease portion 820-*b*, where the first end comprises a generally rectangular shape. Additionally, as seen, the second end of the distal portion 815-*b* comprises a diamond shape (i.e., unlike the curved or circular section seen in the preceding figures).

Figure 8C:
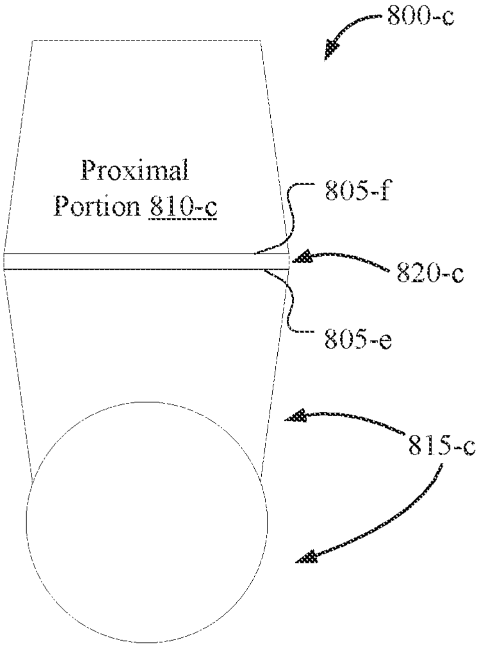
FIG. 8C illustrates an example of a gravity hangtag, according to an alternate embodiment of the disclosure.

FIG. 8C illustrates another example of a gravity hangtag 800-*c* having a proximal portion 810-*c*, a crease portion 820-*c* having two crease edges 805-*e* and 805-*f*, and a distal portion 815-*c*. In this example, both the proximal portion 810-*c* and the distal portion 815-*c* comprise a trapezoidal shape (i.e., each portion comprises a tapered shape with the portions comprising different widths at the first ends of each portion as compared to the second ends). Further, the distal portion 815-*c* has a curved or circular section at the second end, although any other shape may be utilized in different embodiments. In this example, the first ends (i.e., adjacent the crease edges 805) of the proximal portion and the distal portion are shaped and sized to match the width of the crease portion 820-*c*.

Figure 8D:
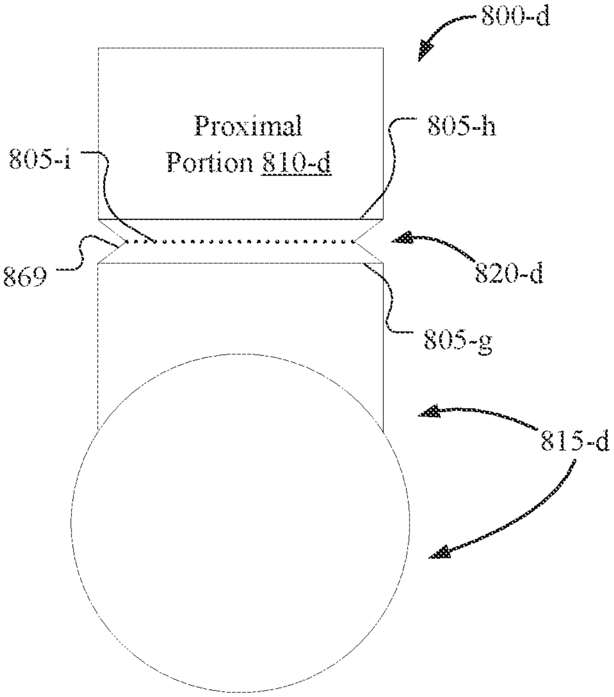
FIG. 8D illustrates an example of a gravity hangtag, according to an alternate embodiment of the disclosure.

FIG. 8D illustrates another example of a gravity hangtag 800-*d* having a generally rectangular proximal portion 810-*d*, a distal portion 815-*d* having a rectangular section at a first end and a curved or circular section at a second end, and a crease portion 820-*d* positioned between the proximal portion 810-*d* and distal portion 815-*d*. In this example, the crease portion 820-*d* is formed using two inverted trapezoids (e.g., trapezoids arranged with their narrower edges facing each other). The crease portion 820-*d* comprises a first crease edge 805-*g* adjacent the distal portion 815-*d* and a second crease edge 805-*h* adjacent the proximal portion 810-*d*. Although not necessary, the crease portion 820-*d* may additionally comprise a third crease edge 805-*i*, where the third crease edge 805-*i* may be optional (shown as optional by the dashed lines). In some cases, the crease portion 820-*d* may also comprise notches 869 between the crease edges 805-*h* and 805-*g*, which may also assist in keeping the gravity hangtag 800-*d* in a stable position relative to a product. For instance, in some circumstances, a product may have a horizontal or substantially horizontal edge and a vertical edge adjacent the horizontal edge, where the vertical edge comprises one or more protrusions. In such cases, the gravity hangtag 800-*d* may be mounted or placed on the horizontal edge and in such a way that the notches 869 interface with the protrusions on the vertical edge. For instance, the notches 869 may be shaped and sized to receive at least a portion of a protrusion on the vertical edge of the product. In another example, the notches 869 may be shaped and sized to interface with a button and/or a button hole on an apparel item, such as the top-most button on a button-down shirt or a blouse. It should be noted that, the gravity hangtag 800-*d* may be configured to be folded along any of the crease edges 805 (e.g., crease edges 805-*g*, 805-*h*, and/or 805-*i*) of gravity hangtag 800-*d*.

The examples described in relation to FIGS. 8A-8D are not intended to be limiting and any other shape/design of the gravity hangtag may be utilized without departing from the scope and spirit of the disclosure. For instance, in some examples, the circular or triangular end may be positioned on the proximal portion instead of the distal portion. Alternatively, both the proximal and distal portions may have second ends having a different shape, width, etc., than the first ends.

Figure 9A:
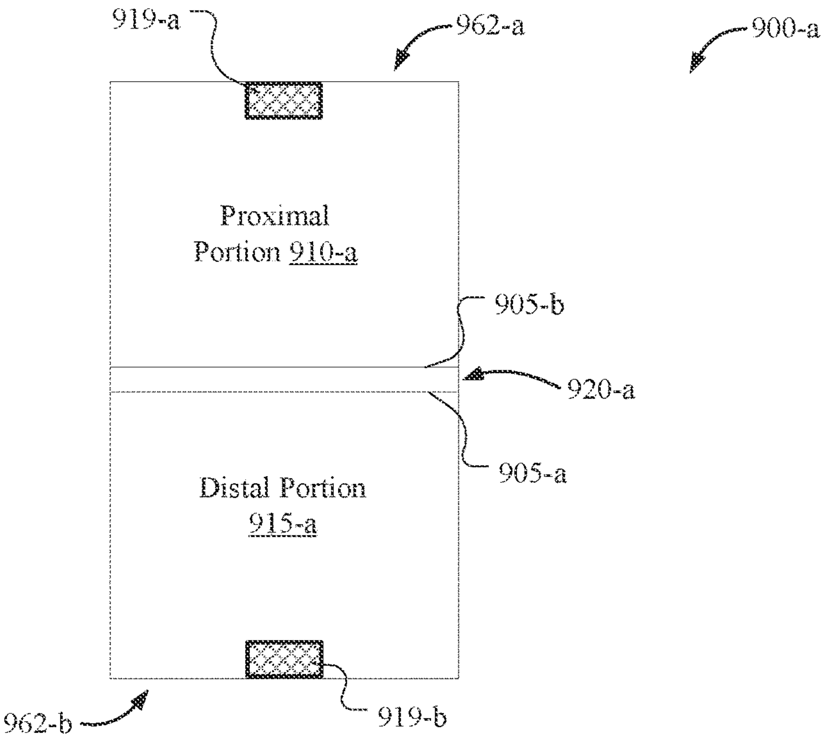
FIG. 9A illustrates an example of a gravity hangtag, according to an alternate embodiment of the disclosure.
Figure 9B:
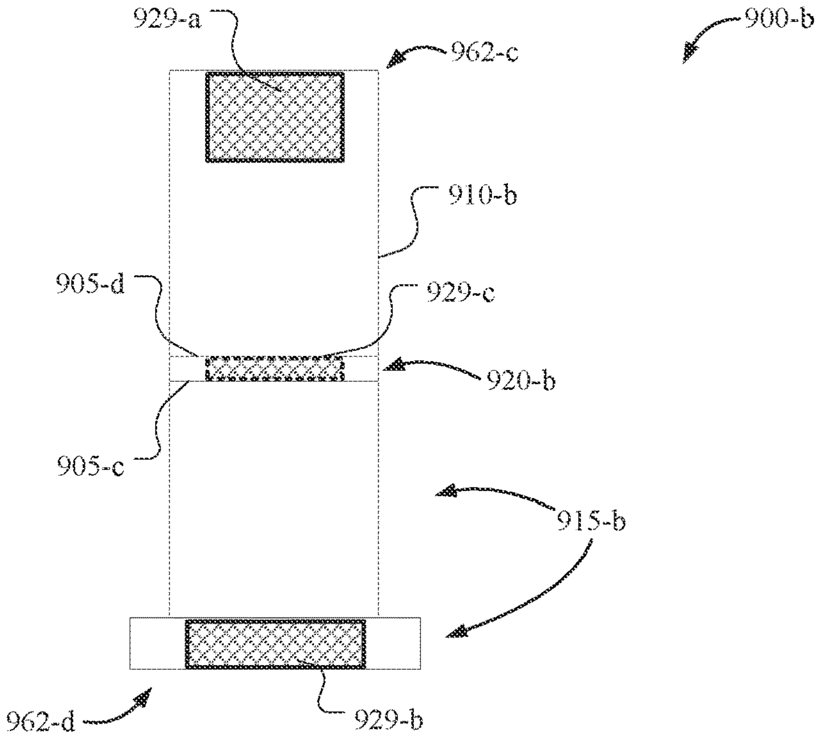
FIG. 9B illustrates an example of a gravity hangtag, according to an alternate embodiment of the disclosure.

FIGS. 9A and 9B illustrate examples of gravity hangtags 900-*a* and 900-*b*, respectively, according to an alternate embodiment of the disclosure.

As described above, in some cases, the product or at least a portion of the product (e.g., first side 441, second side 442, and horizontal edge 431 in FIG. 4) may be clamped between one or more magnetic tips in the proximal and/or distal portions of the tag. It is also contemplated that the proximal/top portion and distal/bottom portion may be similar in dimensions, or the proximal/top portion may be longer than the distal/bottom portion. Other shapes for the portions are also contemplated such as, but not limited to, generally circular, generally trapezoidal, or generally triangular.

FIG. 9A illustrates one example of a gravity hangtag 900-*a*, the gravity hangtag 900-*a* comprising a distal portion 915-*a*, a proximal portion 910-*a*, a crease portion 920 positioned between the distal portion and the proximal portion, and at least one label bearing surface (e.g., shown as label bearing surface 112 in FIG. 1) having a logo (shown as logo 102 in FIG. 1). In some cases, the crease portion 920-*a* comprises two crease edges 905-*a* and 905-*b*, the crease edges separated by a crease length. In some embodiments, the foldable main body may be configured to fold at or near the crease edges, which may enable the gravity hangtag 900-*a* to be mounted or placed over an edge of a product, such as a t-shirt. The gravity hangtag 900-*a* may be configured to remain stable or substantially stable with respect to the product under gravity. For instance, the crease portion 920-*a* may be configured to contact at least a portion of the edge of the product, as previously described in relation to FIGS. 4, 5, and elsewhere herein. The weight of the proximal and the distal portion may help increase frictional engagement of the crease portion 920-*a* with the generally or substantially horizontal edge of the product, which may serve to maintain the foldable main body (e.g., shown as foldable main body 150 in FIG. 1) of the gravity hangtag 900-*a* in a substantially stable arrangement, for instance, over the edge of a product or product display. In some cases, the proximal and distal portion may comprise magnetic tips or ends (e.g., magnetic tip 919-*a* at or near second end 962-*a* of the proximal portion, magnetic tip 919-*b* at or near second end 962-*b* of the distal portion) which may also assist in securing the hangtag on a product. Further, the magnetic tips may also facilitate in increasing the weight or downward force from the crease portion onto the horizontal surface/edge of the product or the product display, which may serve to further enhance stability of the gravity hangtag 900-*a* relative to the product or product display. In the example shown, the proximal portion 910-*a* and distal portion 915-*a* have the same or substantially similar dimensions which may allow the magnetic tips 919-*a* and 919-*b* to attract and magnetically couple to each other when the gravity hangtag 900-*a* is folded and mounted on a product. In other cases, the proximal portion 910-*a* and the distal portion 915-*a* may have different dimensions (e.g., different lengths). In such cases, the positioning of the magnetic tips 919-*a* and 919-*b* may be selected such that they are opposing each other in the folded position. For instance, if the proximal portion 910-*a* is shorter than the distal portion 915-*a*, the magnetic tip 919-*b* on the longer, distal portion may not be located proximal to the second end 962-*b* and may be positioned closer to the crease portion 920-*a*) to allow for opposing positioning of the two magnetic tips 919-*a*, 919-*b* in a folded position.

FIG. 9B illustrates another example of a gravity hangtag 900-*b* comprising a proximal portion 910-*b* having a first end and a second end 962-*c*, a crease portion 920-*b* having two crease edges 905-*c* and 905-*d*, and a distal portion 915-*b* having a first end and a second end 962-*d*. FIG. 9B comprises an alternate shape/design of a gravity hangtag, where the distal portion resembles an inverted 'T'. In this example, the proximal and distal portions of the gravity hangtag comprise adhesive portions 929-*a* and 929-*b*, respectively, at their second ends 962. It should be noted that, in some embodiments, the adhesive portions 929 may cover a substantially larger surface area of the gravity hangtag 900-*b*, for instance, the entirety of the top/proximal portion and the bottom/distal portion. In some cases, the illustration in FIG. 9B depicts inner surfaces of the gravity hangtag 900-*b*, for instance, the surfaces of the gravity hangtag that are not visible to a consumer when the tag is mounted on a product. In some cases, the adhesive portions 929-*a* and 929-*b* comprise an inner, adhesive layer and an outer layer. The outer layer may comprise a removable layer be configured to stick or adhere to the inner, adhesive layer prior to removal of the outer layer and placing the tag on a product. In such cases, the inner, adhesive layer may couple to a surface of a product, which may serve to enhance the stability and positioning of the gravity hangtag 900-*b* relative to the product. In some other cases, the adhesive portions 929-*a* and 929-*b* may comprise a hook-and-loop fastener, or any other applicable adhesive means. It should be noted that, in some embodiments, the crease portion may also comprise an optional adhesive portion 929-*c* (shown as optional by the dashed lines). The optional adhesive portion 929-*c* may implement one or more aspects of the adhesive portions 929-*a* and/or 929-*b*. In other cases, the optional adhesive portion 929-*c* may be different from the adhesive portions 929-*a* and 929-*b*. For instance, adhesive portions 929-*a* and 929-*b* may comprise a hook-and-loop fastener coupling mechanism or a two-layered (e.g., an inner adhesive layer and an outer removable layer covering the inner layer) coupling mechanism, while the adhesive portion 929-*c* may comprise a single adhesive layer (i.e., with no outer removable layer). In some cases, the adhesive portions 929-*a* and 929-*b* may be formed using multiple layers to prevent the proximal portion and the distal portion from sticking to each other, for instance.

Figure 10:
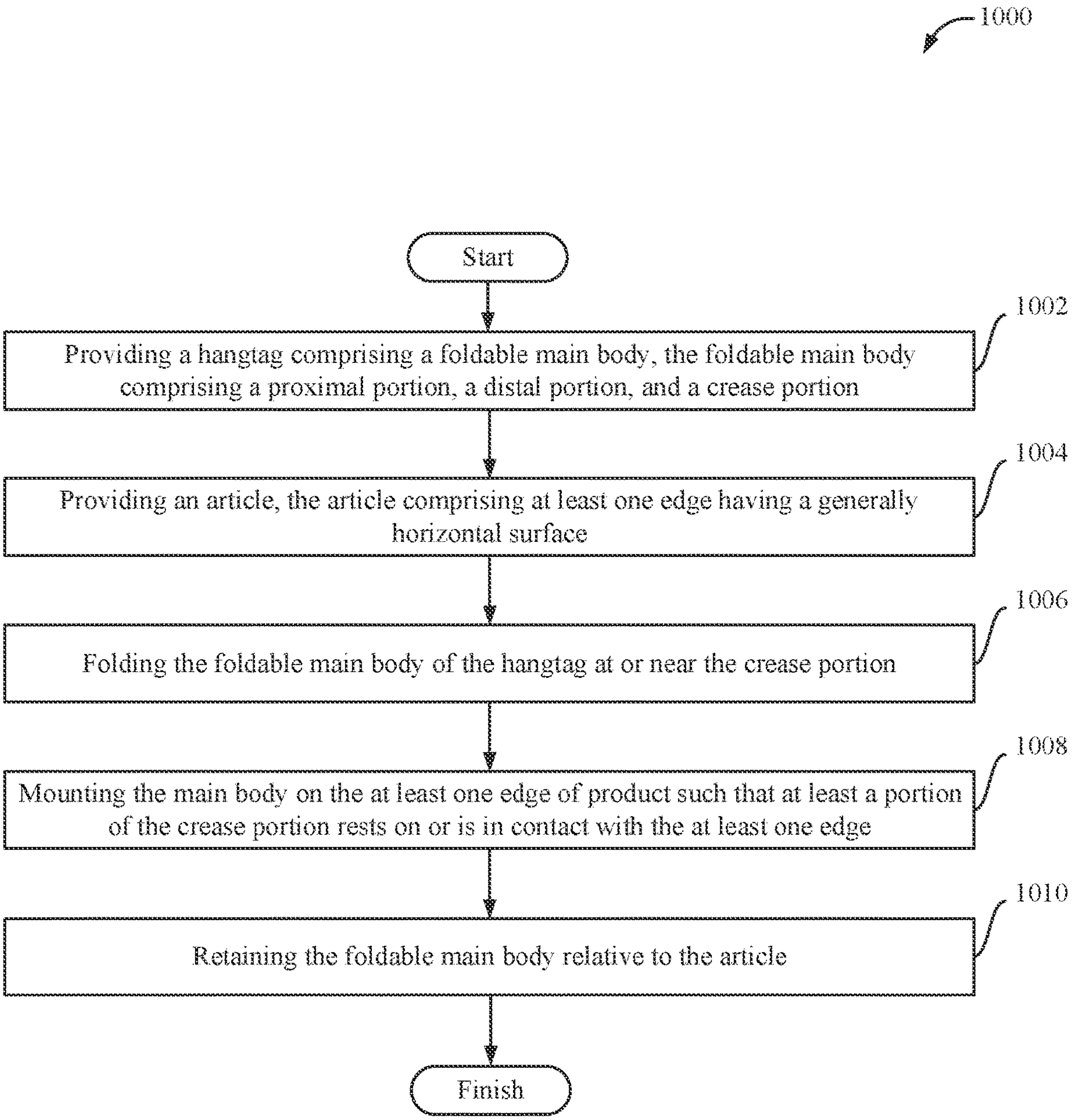
FIG. 10 illustrates an example of a method for manufacturing a gravity hangtag, according to an embodiment of the disclosure.

FIG. 10 illustrates an example of a method 1000 for at least one of placement on and coupling a hangtag to a product or a product display, in accordance with one or more implementations. In some embodiments, the product or product display includes a first side, a second side opposing the first side, and an edge connecting the first side and the second side. It is contemplated that the method 1000 may be associated with one or more embodiments of the hangtag described herein.

At step 1002, the method comprises providing a gravity hangtag comprising a foldable main body, the foldable main body comprising a proximal portion having a first end and a second end, wherein the first end of the proximal portion has a first width; a distal portion having a first end and a second end, wherein the first end of the distal portion has the first width; and a crease portion positioned between the distal portion and the proximal portion, the crease portion having the first width and a first length extending between the distal portion and the proximal portion.

At step 1004, the method comprises providing an article, the article comprising at least one edge having a generally horizontal surface. In some cases, the article may comprise a product (e.g., an apparel item, such as a t-shirt) or a product display (e.g., a clothing hanger) for the product. Other types of articles are contemplated in different embodiments and the examples listed are not intended to be limiting.

At step 1006, the method comprises folding the foldable main body at or near the crease portion, as described above in relation to FIGS. 1-9B.

At step 1008, the method comprises mounting the main body on the edge of the product such that at least a portion of the crease portion rests on or is in contact with the edge.

At step 1010, the method comprises retaining the foldable main body relative to the product via one or more of frictional engagement of at least the portion of the crease portion with the edge (e.g., based on the weight/downward force of the proximal portion and/or the distal portion applying a force from the crease portion onto the generally horizontal surface of the edge), frictional engagement of the proximal portion with the first side of the product, and frictional engagement of the distal portion with the second side of the product.

Figure 11:
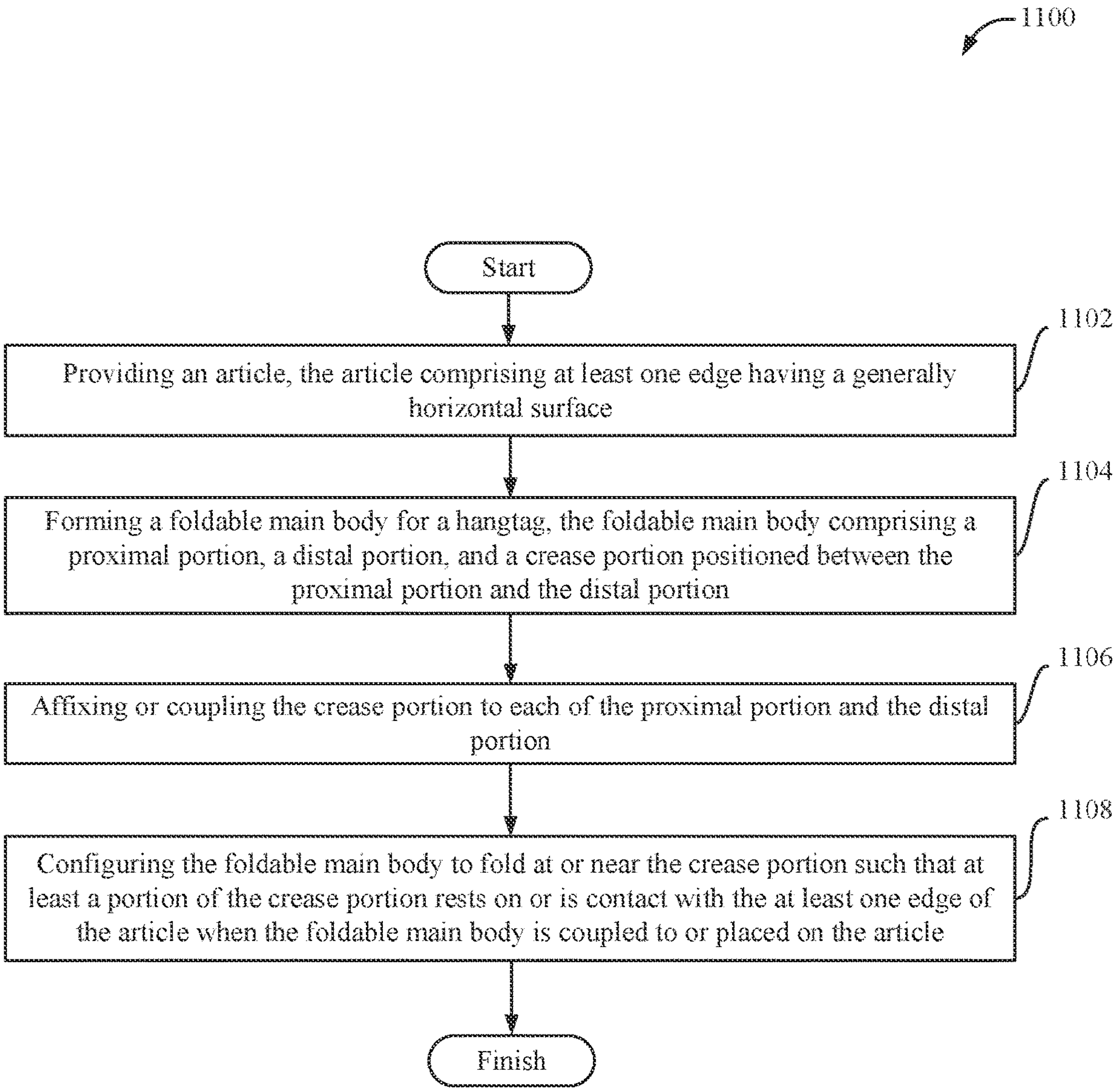
FIG. 11 illustrates an example of a method for placing or coupling a gravity hangtag onto an article, according to an embodiment of the disclosure.

FIG. 11 illustrates an example of a method 1100 of manufacturing a hangtag for placing on an article (e.g., a product, a product display), in accordance with one or more implementations. In some embodiments, the article has a first side, a second side opposing the first side, and an edge connecting the first side and the second side.

At step 1102, the method comprises providing an article, the article comprising at least one edge having a generally horizontal surface. The article may be similar or substantially similar to the article 590 in FIG. 5 and/or the products 430, 630, 730 in FIGS. 4-7.

At step 1104, the method comprises forming a foldable main body for a gravity hangtag, the foldable main body comprising a proximal portion, a distal portion, and a crease portion positioned between the proximal portion and the distal portion. For instance, the method 1100 comprises forming a proximal portion having a first end and a second end, wherein the first end and the second end of the proximal portion have a first width. Further, the method 1100 comprises forming a distal portion, the distal portion having a first end and a second end, wherein the first end of the distal portion has the first width. In some cases, the method 1100 also comprises forming a crease portion, the crease portion having a first crease edge and a second crease edge, each of the first crease edge and the second crease edge having the first width.

At step 1106, the method 1100 comprises affixing, coupling, or integrating the crease portion to each of the proximal portion and the distal portion. In some cases, the crease portion is positioned between the proximal portion and the distal portion such that the first crease edge is adjacent the first end of the proximal portion and the second crease edge is adjacent the first end of the distal portion.

At step 1108, the method 1100 comprises configuring the foldable main body to fold at or near the crease portion such that at least a portion of the crease portion rests on or is contact with the at least one edge of the article when the foldable main body is coupled to or placed on the article. In some cases, the foldable main body may be formed of a flexible or bendable material, such as paper, cardboard (i.e., where the cardboard is scored along the crease edges), metal (i.e., having a pivot mechanism or hinges along the crease edges), to name a few non-limiting examples. In some cases, for instance, if the foldable main body is composed of cardboard, step 1108 may comprise scoring the cardboard. Scoring refers to a process for making cardboard bendable (i.e., without breaking or tearing) at a bend or crease edge. In some cases, scoring cardboard refer to compressing the internal support system of the cardboard material without creating a cut, since cutting through the cardboard weakens its structure and causes it to tear at the bend point. In some cases, a single sheet of cardboard resembling the gravity hangtag may be scored to form the crease edges, which may allow the proximal portion and the distal portion to pivot at the crease edges, thus folding the hangtag.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A hangtag configured for at least one of placement on and coupling to one of a product and a product display, the hangtag comprising a foldable main body, the foldable main body comprising:

- a proximal portion comprising a first end and a second end, wherein the first end of the proximal portion comprises a first width;
- a distal portion comprising a first end and a second end, wherein the first end of the distal portion comprises the first width;
- a crease portion comprising the first width and a first length, the first length extending between the distal portion and the proximal portion; and
- wherein,
  - the foldable main body is configured to be folded at or near the crease portion,
  - the crease portion is adapted for placement on one or more edges of one of the product and the product display such that the proximal portion is adjacent a first side of the product or the product display and the distal portion is adjacent a second, opposing side of the product or the product display, and at least one of the distal portion, proximal portion, and crease portion comprises at least one of a different material, rigidity, and elasticity as compared to at least one other of the distal portion, proximal portion, and crease portion.

2. The hangtag of claim 1, wherein the proximal portion has a first surface area, and the distal portion has a second, different surface area.

3. The hangtag of claim 2, wherein the distal portion comprises a distal rectangular section having the first width at the first end and a curved section at the second end, the curved section unitary with the distal rectangular section, and wherein a diameter of the curved section is larger than the first width.

4. The hangtag of claim 3, wherein the proximal portion comprises a proximal rectangular section having a proximal rectangular section length and the first width;

the first width is of a larger dimension than the proximal rectangular section length;

the proximal rectangular section length of the proximal portion is between around 0.75 inches and around 1.5 inches; and the first width is between around 1.5 inches and around 2.5 inches.

5. The hangtag of claim 3, wherein, the distal rectangular section comprises a distal rectangular section length;

wherein the distal rectangular section length comprises a second length between around 3 inches and around 4 inches;

the second length comprises the diameter of the curved section and at least a portion of the distal rectangular section length; and the diameter of the curved section is between around 1.75 inches and around 3 inches.

6. The hangtag of claim 1, wherein, the crease portion comprises a crease surface, the crease surface having a first plane;

the proximal portion comprises a proximal surface, the proximal surface having a second plane;

the distal portion comprises a distal surface, the distal surface having a third plane;

the first, second and third planes comprise different planes;

the foldable main body is configured to change from a first position to a second position, wherein the second position is configured to one of pinch and clasp the one of a product and a product display;

the first position comprises the first plane, second plane, and third plane in a generally linear position; and the second and third planes in the second position comprise, one of generally and substantially parallel planes, and planes one of substantially and generally perpendicular to the first plane.

7. The hangtag of claim 6, wherein, the crease portion comprises, a first crease edge for receiving a first fold of the main body, the first crease edge located adjacent the proximal portion, and a second crease edge for receiving a second fold of the main body, the second crease edge located adjacent the distal portion;

each of the first crease edge and the second crease edge comprise the first width; and the first length of the crease portion extends between the first crease edge and the second crease edge.

8. The hangtag of claim 7, wherein, the main body further comprises a main body edge;

the main body edge comprises a thickness;

the first length of the crease portion comprises a larger distance than the thickness of the main body edge;

the first crease edge comprises a first pivot axis for the first fold;

the proximal portion comprises a portion rotatably coupled to the crease portion via the first crease edge and configured to rotate about the first pivot axis;

the second crease edge comprises a second pivot axis for the second fold; and the distal portion comprises a portion rotatably coupled to the crease portion via the second crease edge and configured to rotate about the second pivot axis.

9. The hangtag of claim 8, wherein, when the main body is pinched or clasped from the first position to the second position and the hangtag is at least one of placed on and coupled to the product or the product display, the crease surface one of rests upon and couples to a generally horizontal surface adjacent at least one edge of the one of the product and the product display, the proximal surface and the distal surface extend below the crease surface, and the foldable main body remains generally stable on the product or the product display by one or more of:

a weight of the proximal portion and the distal portion applying a force from the crease surface onto the generally horizontal surface;

the weight of the proximal portion and the distal portion applying a frictional force between the crease surface and the generally horizontal surface;

an asymmetry in one or more of a weight, a surface area, and an overall length between the proximal portion and the distal portion;

friction between an inner face of the proximal portion and the first side of the product; and friction between an inner face of the distal portion and the second side of the product.

10. The hangtag of claim 1, wherein, one or more of the proximal portion, the distal portion, and the crease portion display one or more of text and information pertaining to the product; and the information comprises one or more of:

a price, material of composition, cleaning instructions, a manufacturer or brand name, a manufacturer or brand logo, social media information, a Uniform Resource Locator (URL), a bar code, and a Quick Response (QR) code.

11. The hangtag of claim 1, wherein, the second end of the proximal portion and the distal portion are magnetic;

when the foldable main body is folded at or near the crease portion, the second ends of the proximal portion and the distal portion magnetically couple; and the first side and the second side of the product are positioned between the proximal portion and the distal portion.

12. The hangtag of claim 1, wherein the proximal portion and the distal portion comprise an outer face and an inner face;

the inner face of at least one of the proximal portion and the distal portion comprises two or more layers; and the two or more layers comprise at least one adhesive layer.

13. A method for at least one of placing and coupling a hangtag to one of a product and a product display, wherein, the one of a product and a product display comprises a first side, a second side opposing the first side, and at least one edge between the first side and the second side, and the hangtag comprises:

a foldable main body, the foldable main body comprising:

a proximal portion having a first end and a second end, wherein the first end of the proximal portion has a first width;

a distal portion having a first end and a second end, wherein the first end of the distal portion has the first width; and a crease portion positioned between the distal portion and the proximal portion, the crease portion having the first width and a first length extending between the distal portion and the proximal portion;

wherein at least one of the distal portion, proximal portion, and crease portion comprises at least one of a different material, rigidity, and elasticity as compared to at least one other of the distal portion, proximal portion, and crease portion;

the method comprising:

folding the foldable main body at or near the crease portion;

mounting the main body on the at least one edge of the one of a product and a product display such that at least a portion of the crease portion rests on or is in contact with the edge; and coupling the foldable main body to the one of a product and a product display via one or more of:

frictional engagement of at least the portion of the crease portion with the at least one edge, frictional engagement of the proximal portion with the first side of the at least one of a product and a product display, and frictional engagement of the distal portion with the second side of the at least one of a product and a product display.

14. The method of claim 13, wherein, the proximal portion comprises a proximal surface;

the distal portion comprises a distal surface;

the crease portion comprises;

a crease surface, a first crease edge adjacent the proximal portion, and a second crease edge adjacent the distal portion;

each of the first crease edge and the second crease edge comprises the first width;

the first length of the crease portion extends between the first crease edge and the second crease edge;

folding the foldable main body at or near the crease portion comprises:

folding the foldable main body at or near the first crease edge, and folding the foldable main body at or near the second crease edge; and wherein retaining coupling the foldable main body to the one of a product and a product display further comprises one or more of:

applying a force at or near the second end of the distal portion until the distal surface is generally perpendicular to the crease surface, and applying a force at or near the second end of the proximal portion until the proximal surface is generally perpendicular to the crease surface.

15. The method of claim 14, wherein mounting the main body on the edge of one of a product and product display further comprises:

guiding the crease portion along the edge of the product such that the main body remains stable or substantially stable under gravity and based at least in part on one or more of:

an asymmetry in one or more of a weight, a surface area, and an overall length between the proximal portion and the distal portion, a respective weight of the proximal portion and the distal portion applying a force from the crease surface onto a generally horizontal surface of the at least one edge, and a respective weight of the proximal portion and the distal portion applying a force from the friction between the crease surface and the generally horizontal surface.

16. A product, comprising:

a first side;

a second side;

at least one edge connecting the first side and the second side;

a hangtag placed over the at least one edge, the hangtag including:

a foldable main body, the foldable main body comprising:

a proximal portion having a first end and a second end, wherein the first end of the proximal portion has a first width, and wherein the proximal portion comprises a proximal surface;

a distal portion having a first end and a second end, wherein the first end of the proximal portion has the first width, and wherein the distal portion comprises a distal surface; and a crease portion positioned between the distal portion and the proximal portion, the crease portion having the first width and a first length extending between the distal portion and the proximal portion, and wherein the crease portion comprises a crease surface;

wherein at least one of the distal portion, proximal portion, and crease portion comprises at least one of a different material, rigidity, and elasticity as compared to at least one other of the distal portion, proximal portion, and crease portion, wherein the foldable main body is configured to be folded at or near the crease portion from a first position to a second position, the first position comprises a generally linear position and the second position comprises the crease surface, the proximal surface, and the distal surface in separate planes, and wherein the crease portion is shaped and sized to mount the foldable main body over the at least one edge of the product such that the proximal portion is adjacent the first side of the product and the distal portion is adjacent the second side of the product, and wherein the main body is configured to remain stable or substantially stable under gravity and based at least in part on one or more of:

an asymmetry in one or more of a weight, surface area, and an overall length between the proximal portion and the distal portion;

friction between an inner face of the proximal portion and the first side of the product; and friction between an inner face of the distal portion and the second side of the product.

17. The product of claim 16, wherein, the crease portion comprises, a first crease edge for receiving a first fold of the main body, the first crease edge located adjacent the proximal portion, and a second crease edge for receiving a second fold of the main body, the second crease edge located adjacent the distal portion;

each of the first crease edge and the second crease edge comprises the first width; and the first length of the crease portion extends between the first crease edge and the second crease edge.

18. The product of claim 17, wherein, the foldable main body further comprises a main body edge;

the main body edge comprises a thickness;

the first length of the crease portion comprises a larger distance than the thickness of the main body edge;

the first crease edge comprises a first pivot axis for the first fold;

the proximal portion comprises a portion rotatably coupled to the crease portion via the first crease edge and configured to rotate about the first pivot axis;

the second crease edge comprises a second pivot axis for the second fold; and the distal portion comprises a portion rotatably coupled to the crease portion via the second crease edge and configured to rotate about the second pivot axis.

19. The product of claim 18, wherein, when the hangtag is placed over the at least one edge, the crease surface one of rests upon and couples to a generally horizontal surface of the product, the proximal surface and the distal surface extend below the crease surface, and wherein the foldable main body remains generally stable on the product based on a respective weight of each of the proximal portion and the distal portion applying a downward force from the crease surface onto the generally horizontal surface, a frictional force between the crease surface and the generally horizontal surface, or a combination thereof.

* * * * *